(12) United States Patent
Damke et al.

(10) Patent No.: US 11,883,803 B2
(45) Date of Patent: Jan. 30, 2024

(54) HIGHLY ACTIVE DOUBLE METAL CYANIDE COMPOUNDS

(71) Applicant: Henkel AG & Co. KGaA, Duesseldorf (DE)

(72) Inventors: Jan-Erik Damke, Duesseldorf (DE); Johann Klein, Duesseldorf (DE); Marion Marquardt, Rostock (DE); Esteban Mejia, Rostock (DE); Udo Kragl, Kritzmow (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 387 days.

(21) Appl. No.: 17/123,758

(22) Filed: Dec. 16, 2020

(65) Prior Publication Data

US 2021/0122878 A1 Apr. 29, 2021

Related U.S. Application Data

(63) Continuation of application No. PCT/EP2019/064762, filed on Jun. 6, 2019.

(30) Foreign Application Priority Data

Jun. 19, 2018 (EP) .................................... 18178509

(51) Int. Cl.

| | |
|---|---|
| *B01J 27/26* | (2006.01) |
| *C08G 65/26* | (2006.01) |
| *C09D 171/02* | (2006.01) |
| *C09J 171/02* | (2006.01) |
| *C09K 3/10* | (2006.01) |
| *C07F 15/00* | (2006.01) |
| *C01C 3/11* | (2006.01) |
| *C01C 3/00* | (2006.01) |
| *C07F 7/00* | (2006.01) |
| *C07F 13/00* | (2006.01) |
| *C07F 1/08* | (2006.01) |
| *C07F 3/06* | (2006.01) |
| *C07F 9/00* | (2006.01) |
| *C07F 11/00* | (2006.01) |

(52) U.S. Cl.
CPC .............. *B01J 27/26* (2013.01); *C01C 3/001* (2013.01); *C01C 3/11* (2013.01); *C07F 1/08* (2013.01); *C07F 3/06* (2013.01); *C07F 7/00* (2013.01); *C07F 9/00* (2013.01); *C07F 11/00* (2013.01); *C07F 13/00* (2013.01); *C07F 15/00* (2013.01); *C08G 65/2609* (2013.01); *C08G 65/2663* (2013.01); *C08G 65/2693* (2013.01); *C09D 171/02* (2013.01); *C09J 171/02* (2013.01); *C09K 3/10* (2013.01); *C09K 2200/0657* (2013.01)

(58) Field of Classification Search
CPC .. B01J 27/26; C01C 3/001; C01C 3/11; C07F 1/08; C07F 3/06; C07F 7/00; C07F 9/00; C07F 11/00; C07F 13/00; C07F 15/00; C08G 65/2609; C08G 65/2663; C08G 65/2693; C09D 171/02; C09J 171/02; C09K 3/10; C09K 2200/0657
USPC .................................... 502/175; 585/17, 476
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,427,256 A | 2/1969 | Milgrom |
| 3,427,334 A | 2/1969 | Belner |
| 3,427,335 A | 2/1969 | Herold |
| 3,535,342 A | 10/1970 | Emmons |
| 4,355,188 A | 10/1982 | Herold et al. |
| 4,721,818 A | 1/1988 | Harper et al. |
| 4,835,289 A | 5/1989 | Brindoepke |
| 4,843,054 A | 6/1989 | Harper |
| 4,877,906 A | 10/1989 | Harper |
| 4,892,954 A | 1/1990 | Brindoepke et al. |
| 4,987,271 A | 1/1991 | Watabe et al. |
| 5,010,047 A | 4/1991 | Schuchardt |
| 5,385,963 A * | 1/1995 | McBain ................. C08G 81/00 523/436 |
| 5,470,813 A | 11/1995 | Le-Khac |

(Continued)

FOREIGN PATENT DOCUMENTS

| | | | |
|---|---|---|---|
| CN | 101003622 A | 7/2007 | |
| CN | 103275313 A * | 9/2013 | ............. C08G 64/38 |

(Continued)

OTHER PUBLICATIONS

Written Opinion for PCT/EP2019/064752. (Year: 2019).*

(Continued)

*Primary Examiner* — Patricia L. Hailey
(74) *Attorney, Agent, or Firm* — James E. Piotrowski

(57) ABSTRACT

The present invention is directed to supported catalyst having utility in the polymerization and co-polymerization of epoxide monomers, said supported catalyst having the general Formula (I):

$$[DMCC] \cdot b \text{ Supp} \qquad (I)$$

wherein:
[DMCC] denotes a double metal cyanide complex which comprises a double metal cyanide (DMC) compound, at least one organic complexing agent and a metal salt;
Supp denotes a hydrophobic support material; and,
b represents the average proportion by weight of said support material, based on the total weight of [DMCC] and Supp, and is preferably in the range 1 wt. $\%\leq b\leq 99$ wt. %.

16 Claims, 6 Drawing Sheets

(56) References Cited

U.S. PATENT DOCUMENTS

| | | | |
|---|---|---|---|
| 5,482,908 A | * | 1/1996 | Le-Khac ............... C08G 65/30 502/154 |
| 5,536,883 A | | 7/1996 | Le-Khac |
| 5,689,012 A | | 11/1997 | Pazos et al. |
| 5,767,323 A | | 6/1998 | Televantos et al. |
| 5,777,177 A | | 7/1998 | Pazos |
| 5,952,261 A | * | 9/1999 | Combs ............... C08G 65/2663 502/340 |
| 6,156,327 A | | 12/2000 | Sekutowski et al. |
| 6,348,565 B1 | * | 2/2002 | Wehmeyer .......... B01J 31/1633 502/506 |
| 6,362,126 B1 | | 3/2002 | Grosch et al. |
| 6,699,961 B2 | | 3/2004 | Eleveld et al. |
| 6,835,687 B2 | | 12/2004 | Hofmann et al. |
| 6,977,236 B2 | | 12/2005 | Eleveld et al. |
| 7,101,823 B2 | | 9/2006 | Wehmeyer |
| 7,226,887 B2 | | 6/2007 | Wehmeyer |
| 7,811,958 B2 | | 10/2010 | Bohres et al. |
| 9,458,286 B2 | | 10/2016 | Zander et al. |
| 9,757,335 B2 | | 9/2017 | Pernot et al. |
| 11,571,690 B2 | * | 2/2023 | Steelman ............... C08G 65/269 |
| 2004/0133036 A1 | * | 7/2004 | Zirstein ................ C07C 67/26 560/336 |
| 2012/0172566 A1 | * | 7/2012 | Zhang ................. C08G 64/34 977/773 |
| 2015/0018501 A1 | * | 1/2015 | Zhang ................. C08G 64/34 528/412 |

FOREIGN PATENT DOCUMENTS

| | | | | |
|---|---|---|---|---|
| DE | 102008002091 A1 | | 12/2008 | |
| EP | 0119840 A1 | | 9/1984 | |
| EP | 0283148 A2 | * | 9/1988 | ............. C08G 65/10 |
| EP | 0520426 A1 | | 12/1992 | |
| EP | 0894108 B1 | | 7/2001 | |
| GB | 1214413 A | | 12/1970 | |
| GB | 1485925 A | | 9/1977 | |
| JP | S5116611 B1 | | 5/1976 | |
| JP | H02276821 A | * | 11/1990 | ............. C08G 65/02 |
| JP | H0641293 A | | 2/1994 | |
| JP | H09194734 A | * | 7/1997 | ............... C08K 3/26 |
| JP | 2001524945 A | | 12/2001 | |
| JP | 2004530667 A | | 10/2004 | |
| JP | 2006505673 A | | 2/2006 | |
| JP | 2006505673 A | * | 2/2006 | ............... C08F 4/32 |
| JP | 2016509577 A | | 3/2016 | |
| JP | 2022057634 A | | 4/2022 | |
| KR | 20130117600 | * | 10/2013 | ............. B01J 31/12 |
| KR | 20130117600 A | | 10/2013 | |
| KR | 20130117600 A | * | 10/2013 | ............. B01J 31/12 |
| WO | 9944739 A1 | | 9/1999 | |
| WO | 0190219 A1 | | 11/2001 | |
| WO | 2012136657 A1 | | 10/2012 | |
| WO | WO-2023017276 A1 | * | 2/2023 | ............. C08G 65/00 |

OTHER PUBLICATIONS

Shang Chen et al., "Double Metal Cyanide Complex Based on Zn3[Co(CN)6]2 as Highly Active Catalyst for Copolymerization of Carbon Dioxide and Cyclohexene Oxide." Journal of Polymer Science: Part A: Polymer Chemistry, vol. 42, pp. 5284-5291. (Year: 2004).*

Xue-Ke Sun et al., "Alternating Copolymerization of Carbon Dioxide and Cyclohexene Oxide Catalyzed by Silicon Dioxide/Zn-ColII Double Metal Cyanide Complex Hybrid Catalysts with a Nanolamellar Structure." Journal of Polymer Science: Part A: Polymer Chemistry, vol. 46, pp. 3128-3139. (Year: 2008).*

DIN 55672-1:2007-08.

Müller et al. (Green. Chem. 2012, 14, 1168) (Eur. J. Inorg. Chemistry, 2016, 1944).

Nuyken et al. Ring-Opening Polymerization—An Introductory Review Polymers 2013, 5, 361-403.

Duda, A. et al. Thermodynamics and Kinetics of Ring-Opening Polymerization in Handbook of Ring-Opening Polymerization, Wiley-VCH, Weinheim, Germany, (2009) p. 8.

Choijnowski, J. et al. Kinetically controlled ring-opening polymerization, J. Inorg. Organomet. Polym. (1991) 1, pp. 299-323.

Ullmann's Encyclopedia of Industrial Chemistry, 5th Edition (1994) vol. A25, pp. 747-817.

Kirk-Othmer Encyclopedia of Chemical Technology, 4th Edition (1997) vol. 23, pp. 477-541.

Tensid-Taschenbuch, 2nd Edition (1982), H. Stache (ed.), Carl Hanser Verlag, Munich.

Surfactant Science Series, vol. 1-74 (1967-1998) M. J. Schick (Ed.), Marcel Decker, New York.

International Search Report for International PCT Patent Application No. PCT/EP2019/064762 dated Aug. 20, 2019.

Basf: "Pluronic FT PE 6200," Jun. 1, 2018.

Kozbial et al.: "Are Graphitic Surfaces Hydrophobic?" Accounts of Chemical Research., vol. 49, No. 12, Dec. 9, 2016, pp. 2765-2773.

Purcar et al.: "Influence of hydrophobic characteristic of organo-modified precursor on wettability of silica film," Bull. Mater. Sci. vol. 37, No. 1, Feb. 1, 2014, pp. 107-115.

Lundgren et al.: "Wetting of Water and Water/Ethanol Droplets on a Non-Polar Surface: A Molecular Dynamics Study," Langmuir, vol. 18, No. 26, pp. 10462-10466.

* cited by examiner

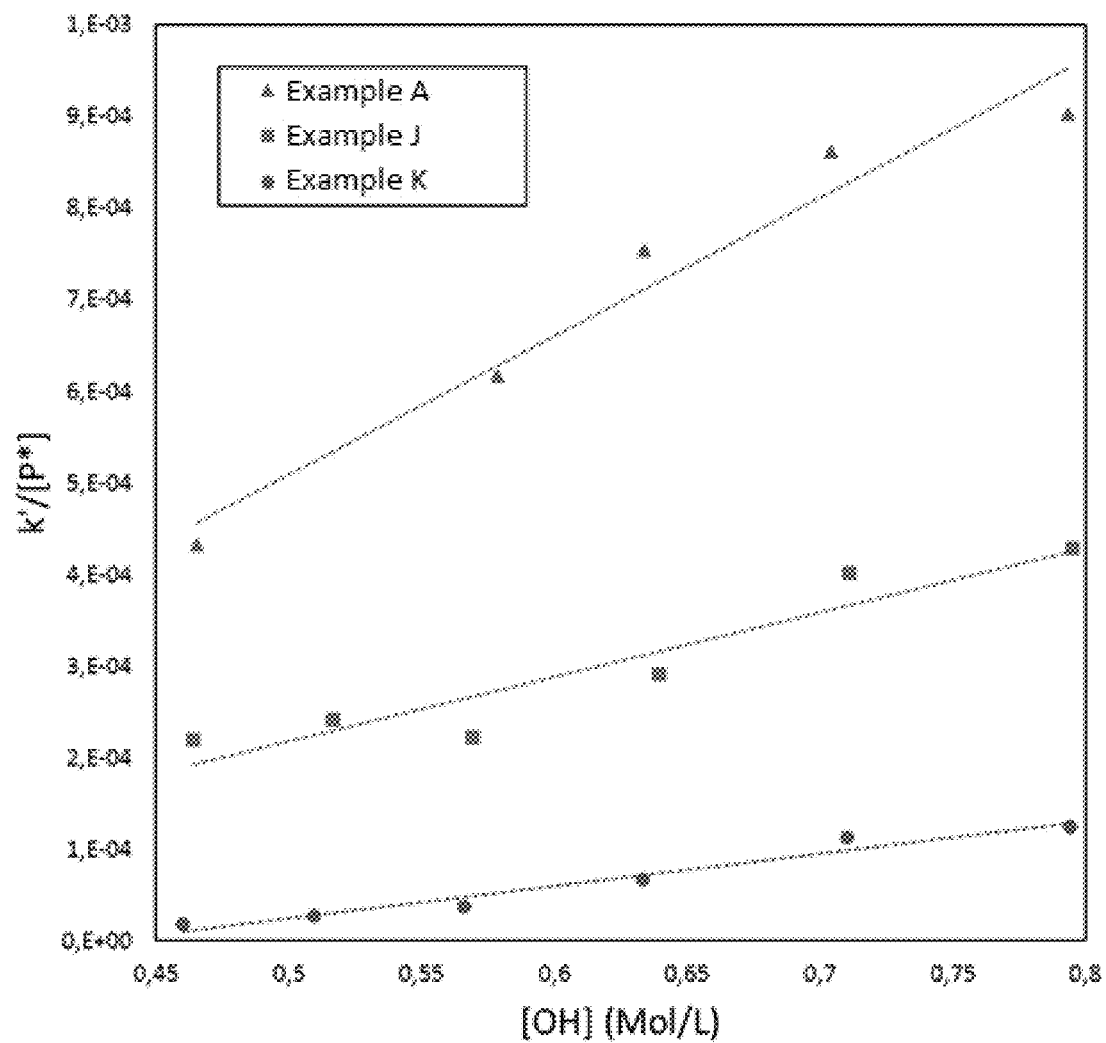

HIGHLY ACTIVE DOUBLE METAL CYANIDE COMPOUNDS

FIELD OF THE INVENTION

The present invention is directed to Double Metal Cyanide (DMC) compounds having utility as catalysts in the synthesis of polymers. More particularly, the present invention is directed to Double Metal Cyanide (DMC) compounds which are provided on a hydrophobic support material, which supported compounds are effective as catalysts for the ring-opening polymerization of epoxide monomers.

BACKGROUND OF THE INVENTION

Double metal cyanide (DMC) compounds, commonly containing zinc hexacyanocobaltate ($Zn_3[Co(CN)_6]_2$) are known in the art as catalysts for inter alia the ring-opening polymerization of epoxides to produce polyethers. As compared to polymers obtained using basic catalysts, the DMC catalysts provide polyethers that are characterized by a narrow molecular weight distribution, a high average molar mass and a very low number of double bonds at the ends of the polymer chains. In addition, DMC catalysts may also be used to polymerize said epoxides with $CO_2$, and with other suitable co-monomers such as oxetanes, cyclic carbonates, cyclic anhydrides and lactones.

As is known in the art, the activity of a given Double Metal Cyanide (DMC) complex is dependent on the presence of defects in its solid-state structure. Double Metal Cyanide compounds prepared in the absence of complexing agents tend to be highly crystalline and inactive for epoxide polymerization. Conversely, DMC complexes prepared in the presence of a suitable complexing agent—typically an ether or an aliphatic alcohol—may be characterized as mixtures of a highly crystalline DMC compound with a more amorphous component: such complexes can actively catalyze the polymerization of epoxides.

There are, of course, several reports in the patent literature dealing with DMC catalysts, their applications and their associated activity. Reference may be made, for example, to: U.S. Pat. No. 3,278,457 (Milgrom et al.); U.S. Pat. No. 3,278,458 (Robert); U.S. Pat. No. 3,278,459 (Johnston); U.S. Pat. No. 3,427,256 (Milgrom); U.S. Pat. No. 3,427,334 (Belner); U.S. Pat. No. 3,427,335 (Herold); and, U.S. Pat. No. 5,470,813 (Le-Khac).

In addition to the above documents, a number of citations have focused upon the need to effectively remove the residues of DMC catalysts from polymers, such as polyether polyols, produced with said catalysts. Mention in this regard may be made of: U.S. Pat. Nos. 4,355,188; 4,721,818; 4,877,906; 4,987,271; and, U.S. Pat. No. 5,010,047. Although the processes described in these citations are effective for the elimination of the catalytic residues, they generally require the use of additional reagents and relatively complicated operations.

U.S. Pat. No. 4,843,054 (Harper) proposes the preparation of filterable DMC catalysts suitable for the polymerization of propylene oxide. For this, the reaction of zinc chloride and potassium hexacyanocobaltate is carried out in a water-diglyme mixture in the presence of an inert filtration co-adjuvant selected from the group consisting of: alumina; silica gel; aluminium silicate; magnesium silicate; diatomaceous earth; perlite; carbon black; and, carbon.

WO 2001090219 A1 (Dow Global Technologies Inc.) describes the preparation of supported double metal cyanide complexes having utility as alkylene oxide polymerization catalysts and which may be easily separated from the polymerization product and recycled. Said active catalysts are characterized by containing a silane-functional complexing agent.

WO 1999044739 A1 (BASF AG) relates to double metal cyanide catalysts for the preparation of polyether alcohols having a low terminal unsaturation via the catalytic ring-opening polymerization of alkylene oxides. The double metal cyanides (DMC) are characterized in their being applied to, incorporated into or molded into solid, inert, un-foamed supports comprising aluminium oxide.

CN 101003622 (Zhang, X. et al.) also describes a filterable DMC catalyst prepared by the co-precipitation of zinc hexacyanocobaltate with $SiO_2$ or $TiO_2$; ortho silicate or titanate esters are respectively used as the precursors to said supporting oxide materials.

Aside from filterability, a further advantage to the utilization of solid supports in the synthesis of DMC catalysts is the enhancement of their long-term performance through the stabilization of the dispersed catalytically active particles by limiting the agglomeration thereof. Further, the supports can enable a reduction of the quantity of the DMC catalyst phase, thereby reducing the amount of expensive transition metals in the mixture.

Willer et al. (Green. Chem. 2012, 14, 1168) prepared a series of hybrid sol-gel DMC catalysts of zinc hexacyanocobaltate and $SiO_2$ by co-precipitation: the authors demonstrated the strong dependence of the catalyst's activity and selectivity with the pH of the synthesis mixture. The same group later reported a nanoparticulate $TiO_2$-supported DMC catalyst in which that support enhanced the Lewis acidity of the catalyst and concomitantly its activity (*Eur. J. Inorg. Chemistry*, 2016, 1944).

Whilst acknowledging the above prior art, there is considered to be a continuing need for DMC catalysts that can efficiently catalyze the polymerization of epoxides, thus making possible a controllable and cost-efficient method for producing epoxide-based polymers. The object of the present invention is therefore to provide a supported catalyst system which makes effective reaction control possible with high reaction rates (k') in the production of homo- and/or copolymers of epoxides and optionally other monomers.

STATEMENT OF THE INVENTION

In accordance with a first aspect of the invention there is provided a supported catalyst having the general Formula (I):

$$[DMCC]*b \; Supp \qquad (I)$$

wherein:
[DMCC] denotes a double metal cyanide complex which comprises a double metal cyanide (DMC) compound, at least one organic complexing agent and a metal salt;
Supp denotes a hydrophobic support material; and,
b represents the average proportion by weight of said support material, based on the total weight of [DMCC] and Supp, and is preferably in the range 1 wt. %≤b≤99 wt. %, more preferably in the range 10 wt. %≤b≤70 wt. %,
wherein the hydrophobic support material is selected from the group consisting of hydrophobic materials characterized by a methanol wettability value of at least 30 vol. %, as determined by the methanol wettability test as described in the description; carbonaceous inorganic solid materials; or inorganic solid materials which are isoelectronic with carbon.

Preferably said double metal cyanide complex [DMCC] is represented either by the general Formula (II-A)

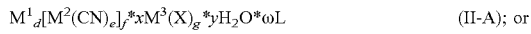

(II-A); or by general Formula (II):

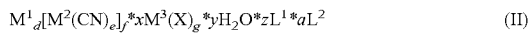

(II)

wherein:
- $M^1$ is a Zn, Fe, Co, Ni, Mn, Cu, Sn or Pb ion;
- $M^2$ is a Fe, Co, Mn, Cr, Ir, Rh, Ru or V ion;
- $M^3$ is a Zn, Fe, Co, Ni, Mn, Cu, Sn, Pb, Cr, Ir, Rh, Ru or V ion;
- X is an anion;
- L is an organic complexing agent;
- $L^1$ and $L^2$ are distinct from one another and represent respectively first and second organic complexing agents;
- d, e, f and g are each integers >0 but have values such that the complex $M^1_d[M^2(CN)_e]_f*xM^3(X)_g$ is electrically neutral;
- $0.1 \leq x \leq 5$;
- $0.1 \leq y \leq 1$;
- $0.0001 \leq \omega \leq 6$;
- $0.0001 \leq z \leq 1$; and,
- $0.0001 \leq a \leq 5$.

In accordance with a second aspect of the present invention, there is provided a method for producing the supported catalyst as defined in Formula (I) above and in the appended claims, said method comprising mixing: at least one organic complexing agent; said hydrophobic support (Supp); and, at least one double metal cyanide compound.

In accordance with a third aspect of the invention there is provided the use of the supported catalyst as defined herein above and in the appended claims in: i) the ring opening polymerization of at least one epoxide monomer; or the co-polymerization of carbon dioxide and at least one epoxide monomer.

In accordance with a fourth aspect of the invention there is provided a method for producing a functionalized polymer or copolymer, said method comprising the steps of:
a) providing an initiator, said initiator comprising or consisting of an active hydrogen-containing compound capable of alkoxylation by an epoxide compound;
b) providing a supported catalyst as defined herein above and in the appended claims; and,
in the presence of said initiator and said supported catalyst, performing a ring opening polymerization of at least one epoxide monomer or co-polymerization of carbon dioxide and at least one epoxide monomer.

In accordance with a fifth aspect of the present invention, there is provided the use of the functionalized polymer or copolymer obtainable by the method defined herein above and in the appended claims as a reactive component for coating, sealant or adhesive compositions based on active hydrogen reactive compounds.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) calibrated against polystyrene standards in accordance with DIN 55672-1:2007-08 at 40° C., unless otherwise stipulated.

As used herein, "polydispersity index" refers to a measure of the distribution of molecular mass in a given polymer sample. The polydispersity index is calculated by dividing the weight average molecular weight (Mw) by the number average molecular weight (Mn).

As used herein, the term "equivalent (eq.)" relates, as is usual in chemical notation, to the relative number of reactive groups present in the reaction; the term "milliequivalent" (meq) is one thousandth ($10^{-3}$) of a chemical equivalent.

The term "equivalent weight" as used herein refers to the molecular weight divided by the number of a function concerned. As such, "epoxy equivalent weight" (EEW) means the weight of resin, in grams, that contains one equivalent of epoxy.

Unless otherwise stated, hydroxyl (OH) values given herein are determined following Deutsche (DGF) Einheitsmethoden zur Untersuchung von Fetten, Fettprodukten, Tensiden and verwandten Stoffen (Gesamtinhaltsverzeichnis 2016) C-V 17b (53).

As used herein, the term "halide" denotes fluoride, chloride, bromide or iodide anions.

As used herein, "$C_1$-$C_8$ alkyl" group refers to a monovalent group that contains 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)— should be noted.

As used herein, "$C_2$-$C_{12}$ alkenyl" group refers to an aliphatic carbon group that contains 2 to 12 carbon atoms and at least one double bond. Like the aforementioned alkyl group, an alkenyl group can be straight or branched, and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. And Examples of $C_2$-$C_{12}$ alkenyl groups include, but are not limited to: 2-butenyl; 4-methylbutenyl; 1-pentenyl, 2-pentenyl, 3-pentenyl, 4-pentenyl, 4-methyl-3-pentenyl, 1-hexenyl, 3-hexenyl, 5-hexenyl, 1-heptenyl, 1-octenyl and n-dodecenyl.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

The term "polymerization conditions" means the reaction conditions necessary to combine monomers into polymers, and in the context of this invention, those conditions necessary for ring-opened alkylene oxides to combine with one another to form a polyether polymer.

As used herein, the term "ring-opening polymerization" denotes a polymerization in which a cyclic compound (monomer) is opened to form a linear polymer. Reference in this context may be made to inter alia in: i) Duda, A. et al. *Thermodynamics and Kinetics of Ring-Opening Polymerization* in *Handbook of Ring-Opening Polymerization*, Wiley-VCH, Weinheim, Germany, (2009) page 8; ii) Choijnowski, J. et al. *Kinetically controlled ring-opening polymerization*, J. Inorg. Organomet. Polym. (1991) 1, pages 299-323; and, iii) Nuyken et al. *Ring-Opening Polymerization—An Introductory Review* Polymers 2013, 5, 361-403.

As used herein, the term "catalytic amount" means a sub-stoichiometric amount of catalyst relative to a reactant.

The term "double metal cyanide (DMC) compound" is used in accordance with its standard meaning as an inorganic compound compromising cyanide anions and two different metal cations. For completeness, the two metal cations differ from each other based either on the metal per se or on their oxidation numbers.

Double metal cyanide catalyst complexes and the methods by which such complexes may be prepared are known in the art. The attention of the reader may, for example, be directed to: US 2008/0167502 (BASF); US 2003/0158449 (Bayer); US 2003/0069389 (Shell); US 2004/0220430 (Repsol Quimica); US 2005/0065383 (Dow); WO2012/136657 A1 (Henkel AG & Co. KGgA); EP0894108 (Arco); U.S. Pat. No. 5,767,323 (Yiannakis et al.); and, U.S. Pat. No. 5,536,883 (Arco). With specific regard to double metal cyanide (DMC) catalyst complexes of Formula (I), the disclosure of WO2012/136658 A1 (Henkel AG & Co. KGgA) and particularly the passage from page 2, final paragraph to page 6, 1$^{st}$ paragraph thereof, is incorporated herein by reference.

In those embodiments where the double metal cyanide catalyst complexes comprise an alcohol (A), that alcohol term is intended to encompass both the protonated and de-protonated (alcoholate) forms thereof.

As regards said double metal cyanide catalyst complexes, the term "carboxylate" refers to —COO$^-$ moiety. Suitable carboxylate anions may be aliphatic or aromatic and may typically contain from 1 to 24, preferably from 2 to 18 and more preferably from 2 to 12 carbon atoms. Examples of aliphatic carboxylate anions include but are not limited to: formate; acetate; propionate; butyrate; 2-ethylhexanoate; n-octoate; and, decanoate. Examples of aromatic carboxylates include but are not limited to: benzoate; alkyl-substituted benzoate; halo-substituted benzoate; 4-cyanobenzoate; 4-trifluoromethylbenzoate; salicylate; 3,5-di-t-butylsalicylate; and, subsalicylate.

As further used herein with regard to said double metal cyanide catalyst complexes, "an organic complexing agent"—denoted as (L, $L^1$, $L^2$) in Formulae (II) and (II-A)—is understood to be an organic compound that has a functional group acting as an electron donor and is therefore capable of occupying a coordination site on a metallic central atom or central ion. Herein, compounds that are suitable as organic complexing agents preferably also exhibit a certain solubility in water.

Suitable organic complexing agents of the present invention—denoted where applicable as L, $L^1$ and $L^2$—may be monomeric, oligomeric or polymeric compounds and may broadly include: alcohols and in particular aliphatic $C_1$ to $C_{24}$ alcohols and polyalkylene glycol homo- and co-polymers; aldehydes; ketones; ethers, such as monoglyme, diglyme, 1,4-dioxane and furan; esters; amides; urea derivatives; nitriles; sulfides; and, mixtures of two or more of the above-mentioned compounds.

In an illustrative embodiment, each organic complexing agent (L, $L^1$, $L^2$) of Formulae (II) and (II-A) may be independently selected from the group consisting of: aliphatic $C_1$ to $C_{24}$ alcohols such as ethanol, i-propyl alcohol, n-butyl alcohol, i-butyl alcohol, sec-butyl alcohol, tert-butyl alcohol; monoglyme; diglyme; 1,4-dioxane; furan; polyalkylene glycol homo- and co-polymers; polycarbonates; polyalkylene glycol sorbitan esters; polyalkylene glycol glycidyl ethers; polyacrylamide; poly(acrylamide-co-acrylic acid); polyacrylic acid; poly(acrylamide-co-maleic acid); polyacrylonitrile; polyalkyl acrylate; polyalkyl methacrylate; polyvinyl methyl ether; polyvinyl ethyl ether; polyvinyl acetate; polyvinyl alcohol; poly-N-vinylpyrrolidone; poly(N-vinylpyrrolidone-co-acrylic acid); polyvinyl methyl ketone; poly(4-vinylphenol); poly(acrylic acid-co-styrene); oxazoline polymers; polyalkylenimines; maleic acid and maleic anhydride copolymers; hydroxyethylcellulose; polyacetates; ionic surface- and interface-active compounds; carboxylic esters of polyhydric alcohols; and, glycosides.

The term "polyalkylene glycol" designates polyalkyleneglycol radicals of which the alkylene radical desirably contains from 2 to 7 carbon atoms. Thus, in some embodiments, polyalkylene glycol polymers can include polymers of the following general formula H—O—(RO)$_x$—H in which: R is a linear or branched $C_2$ to $C_7$ alkyl; and, x is a positive integer in the range of from 2 to 1000. Importantly, polyalkylene glycol polymers can be in the form of a homopolymer, or mixtures or combinations of homopolymers, or can include copolymers, such as block or random copolymers, or mixtures of combinations of such copolymers, or can include mixtures or combinations of homopolymers and copolymers.

The term "ionic surface- or interface-active compounds" employed in relation to said double metal cyanide catalyst complexes is established in the art, as may be attested to by referring to inter alia: *Ullmann's Encyclopedia of Industrial Chemistry*, 5$^{th}$ Edition (1994) Vol. A25, pp. 747-817; *Kirk-Othmer Encyclopedia of Chemical Technology*, 4$^{th}$ Edition (1997) Vol. 23, pp. 477-541, John Wiley & Sons, New York; *Tensid-Taschenbuch*, 2$^{nd}$ Edition (1982), H. Stache (ed.), Carl Hanser Verlag, Munich; and, *Surfactant Science Series*, Vol. 1-74 (1967-1998) M. J. Schick (Ed.), Marcel Decker, New York. Examples of such ionic surface- or interface-active compounds may be found in the group of surfactants, soaps, emulsifiers, detergents and dispersants.

The double metal cyanide catalyst complexes according to the present invention may be crystalline, partially crystalline or amorphous: crystallinity is conventionally analysed by powder X-ray diffractometry. Further, the composition of the double metal cyanide catalyst complexes may conventionally be analysed by means of: gas chromatography; elemental analysis; thermogravimetry; or, extractive removal of the moieties (L, L$^1$, L$^2$) thereof with subsequent gravimetric determination.

As used herein, "silica" is intended to refer to any type of silica, silicic acid or a silicic acid derivative. The term particularly includes precipitated silica, crystalline silica, colloidal silica, silica xerogels, silica aerogels and fumed silica.

As used herein, the term "carbonaceous material" refers to any type of coal or carbon allotropes independent of its source or production method.

As used herein, the term "isoelectronic material" refers to a material which is composed of two or more chemical species such as atoms, molecules, radicals, ions, etc., differing in the atoms that comprise them while having the same number of valence electrons and the same structure.

Where mentioned herein, the "methanol wettability value" refers to the concentration of methanol (vol % of methanol in methanol/water mixture) required to wet 100 percent of support materials, i.e., the amount of methanol needed to produce 100 percent wetting (0 percent suspended and 100 percent in the sediment). Any hydrophobic support material, e.g., fumed oxides of which surfaces have been modified with non-hydrolysable organic molecules cannot be wetted by water. However, these materials can be wetted using a methanol/water mixture. The content of methanol in such mixture—in vol %—is a measure for the degree of hydrophobicity. The methanol wettability value is measured according to the methanol wettability test as described herein.

As used herein, the term "BET surface area" refers to the Brunauer, Emmett and Teller (BET) method according to ASTM D1993-91. Where applicable to the support materials of the present invention, the BET surface area was here determined by fitting five relative-pressure points from a nitrogen sorption isotherm measurement that was made with a Micromeritics TriStar 3000™ instrument. A FlowPrep-060™ station provided heat and a continuous gas flow to prepare samples for analysis. Prior to nitrogen sorption, the support material (inorganic oxide) samples were dried by heating to a temperature of 160° C. in flowing nitrogen (P5 grade) for a minimum of one (1) hour.

The term "Lewis acid" used herein denotes any molecule or ion—often referred to as an electrophile—capable of combining with another molecule or ion by forming a covalent bond with two electrons from the second molecule or ion: a Lewis acid is thus an electron acceptor. The preferred Lewis acids for use in the polymerization processes of the present invention are characterized as being "non-protic": they are Lewis acids which are not capable of functioning as a source of a proton (H+). Particularly preferred Lewis acids for purposes of this invention include halides of elements selected from the group consisting of aluminum, manganese, iron, cobalt, boron, iron, titanium, tin, chromium, magnesium, vanadium, hafnium, zirconium and zinc.

In the homo- and co-polymerization processes of the present invention, the amount of (non-protic) Lewis acid should be adjusted such that the activity of the double metal cyanide complex catalyst, as measured by the weight of epoxide reacted per unit of time at a given temperature, does not decrease more than 20% as compared to the catalyst activity under the same conditions in the absence of Lewis acid: in this regard it will often be advantageous to utilize a Lewis acid: [DMCC] weight ratio in the range of about 0.1 to 1.0.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

As used herein, "polyol" refers to any compound comprising two or more hydroxyl groups. The term thus encompasses diols, triols and compounds containing four or more —OH groups.

As used herein "polyisocyanate" means a compound comprising at least two —N=C=O functional groups, for example from 2 to 5 or from 2 to 4 —N=C=O functional groups. Suitable polyisocyanates include aliphatic, cycloaliphatic, aromatic and heterocyclic isocyanates, dimers and trimers thereof, and mixtures thereof.

Aliphatic and cycloaliphatic polyisocyanates can comprise from 6 to 100 carbon atoms linked in a straight chain or cyclized and having at least two isocyanate reactive groups. Examples of suitable aliphatic isocyanates include but are not limited to straight chain isocyanates such as ethylene diisocyanate, trimethylene diisocyanate, tetramethylene diisocyanate, 1,6-hexamethylene diisocyanate (HDI), octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, and bis (isocyanatoethyl) ether. Exemplary cycloaliphatic polyisocyanates include, but are not limited to, dicyclohexylmethane 4,4'-diisocyanate (H$_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate (H$_6$XDI), 1-methyl-2,4-diisocyanato-cyclohexane, m- or p-tetramethylxylene diisocyanate (m-TMXDI, p-TMXDI) and dimer fatty acid diisocyanate.

The term "aromatic polyisocyanate" is used herein to describe organic isocyanates in which the isocyanate groups are directly attached to the ring(s) of a mono- or polynuclear aromatic hydrocarbon group. In turn the mono- or polynuclear aromatic hydrocarbon group means an essentially planar cyclic hydrocarbon moiety of conjugated double bonds, which may be a single ring or may include multiple condensed (fused) or covalently linked rings. The term aromatic also includes alkylaryl. Typically, the hydrocarbon (main) chain includes 5, 6, 7 or 8 main chain atoms in one cycle. Examples of such planar cyclic hydrocarbon moieties include, but are not limited to, cyclopentadienyl, phenyl, napthalenyl-, [10]annulenyl-(1,3,5,7,9-cyclodecapentaenyl-), [12]annulenyl-, [8]annulenyl-, phenylene (perinaphthene), 1,9-dihydropyrene, chrysene (1,2-benzophenanthrene). Examples of alkylaryl moieties are benzyl, phenethyl, 1-phenylpropyl, 2-phenylpropyl, 3-phenylpropyl, 1-naphthylpropyl, 2-naphthylpropyl, 3-naphthylpropyl and 3-naphthylbutyl.

Exemplary aromatic polyisocyanates include, but are not limited to: all isomers of toluene diisocyanate (TDI), either in the isomerically pure form or as a mixture of several isomers; naphthalene 1,5-diisocyanate; diphenylmethane 4,4'-diisocyanate (MDI); diphenylmethane 2,4'-diisocyanate and mixtures of diphenylmethane 4,4'-diisocyanate with the 2,4' isomer or mixtures thereof with oligomers of higher functionality (so-called crude MDI); xylylene diisocyanate (XDI); diphenyl-dimethylmethane 4,4'-diisocyanate; di- and tetraalkyl-diphenylmethane diisocyanates; dibenzyl 4,4'-diisocyanate; phenylene 1,3-diisocyanate; and, phenylene 1,4-diisocyanate.

It is noted that the term "polyisocyanate" is intended to encompass prepolymers formed by the partial reaction of the aforementioned aliphatic, cycloaliphatic, aromatic and heterocyclic isocyanates with polyols to give isocyanate functional oligomers, which oligomers may be used alone or in combination with free isocyanate(s).

The term "anhydrous" is intended to mean herein that the applicable reaction mixture or component comprises less than 0.25 wt. % of water, based on the weight of the mixture or component. The term "essentially free of solvent" should be interpreted analogously as meaning the relevant composition comprises less than 0.25 wt. % of solvent.

DETAILED DESCRIPTION OF THE INVENTION

The supported catalyst of the present invention may be most broadly defined in accordance with Formula (I):

[DMCC]*b Supp            (I)

wherein:
[DMCC] denotes a double metal cyanide complex which comprises a double metal cyanide (DMC) compound, at least one organic complexing agent and a metal salt;
Supp denotes the hydrophobic support material; and,
b represents the average proportion by weight of said support material, based on the total weight of [DMCC] and Supp, and is preferably in the range 1 wt. %≤b≤99 wt. %, more preferably in the range 10 wt. %≤b≤70 wt. %,
wherein the hydrophobic support material is selected from the group consisting of hydrophobic materials characterized by a methanol wettability value of at least 30 vol. %, as determined by the methanol wettability test as described in the description; carbonaceous inorganic solid materials; or inorganic solid materials which are isoelectronic with carbon.

The average proportion by weight of the hydrophobic support material is preferably in the range 1 wt. %≤b≤99 wt. %, more preferably in the range 10 wt. %≤b≤70 wt. % based on the total weight of [DMCC] and Supp. In particularly preferred embodiments, the average proportion of the support material is in the range of 20 wt. %≤b≤70 wt. %, more preferably in the range 30 wt. %≤b≤70 wt. %, based on the total weight of [DMCC] and Supp.

Higher catalytic activity can be achieved by using a hydrophobic support material.

In a preliminary embodiment, said double metal cyanide complex [DMCC] is represented by the general Formula (II-A)

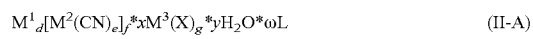

$M^1_d[M^2(CN)_e]_f * xM^3(X)_g * yH_2O * \omega L$            (II-A)

wherein:
$M^1$ is a Zn, Fe, Co, Ni, Mn, Cu, Sn or Pb ion;
$M^2$ is a Fe, Co, Mn, Cr, Ir, Rh, Ru or V ion;
$M^3$ is a Zn, Fe, Co, Ni, Mn, Cu, Sn, Pb, Cr, Ir, Rh, Ru or V ion;
X is an anion;
L is an organic complexing agent;
d, e, f and g are each integers >0 but have values such that the complex $M^1_d[M^2(CN)_e]_f * xM^3(X)_g$ is electrically neutral;
$0.1 \leq x \leq 5$;
$0.1 \leq y \leq 1$; and,
$0.0001 \leq \omega \leq 6$.

In a further embodiment, the aforementioned double metal cyanide complex [DMCC] is represented by the general Formula (II):

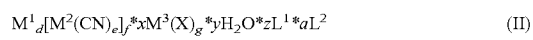

$M^1_d[M^2(CN)_e]_f * xM^3(X)_g * yH_2O * zL^1 * aL^2$            (II)

wherein:
$M^1$ is a Zn, Fe, Co, Ni, Mn, Cu, Sn or Pb ion;
$M^2$ is a Fe, Co, Mn, Cr, Ir, Rh, Ru or V ion;
$M^3$ is a Zn, Fe, Co, Ni, Mn, Cu, Sn, Pb, Cr, Ir, Rh, Ru or V ion;
X is an anion;
$L^1$ and $L^2$ are distinct from one another and represent respectively first and second organic complexing agents;
d, e, f and g are each integers >0 but have values such that the complex $M^1_d[M^2(CN)_e]_f * xM^3(X)_g$ is electrically neutral;
$0.1 \leq x \leq 5$;
$0.1 \leq y \leq 1$;
$0.0001 \leq z \leq 1$; and,
$0.0001 \leq a \leq 5$.

For completeness, said first ($L^1$) and second ($L^2$) organic complexing agents are distinct from one another.

In general formulae (II) and (II-A), x, y, ω, z and a are to be understood as representing the average molar proportion of the particular constituent, based on a (single) complex $M^1_d[M^2(CN)_e]_f$. The integers d, e, f and g, on the other hand, have a stoichiometric meaning, which is limited to the complex $M^1_d[M^2(CN)_e]_f * M^3(X)_g$ and represents a complete charge balance within this complex.

X in general Formulae (II) and (II-A) is preferably an anion selected from the group consisting of halide, hydroxide, sulphate, hydrogensulphate, carbonate, hydrogencarbonate, cyanide, thiocyanide, isocyanate, cyanate, carboxylate, nitrate, nitrite, borate and antimonite.

Good results have been obtained for that embodiment wherein said double metal cyanide complex [DMCC] is represented by Formula (II-A) and further meets at least one of the following conditions:

i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) L is selected from the group consisting of aliphatic $C_1$ to $C_{24}$ alcohols, monoglyme, diglyme, 1,4-dioxane, furan, polypropyleneglycol (PPG) homopolymers, polypropyleneglycol (PPG) copolymers and mixtures of two or more thereof.

Equally, good results have been obtained for that embodiment where said double metal cyanide complex [DMCC] of Formula (II) meets at least one of the following conditions:
i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) $L^1$ and $L^2$ are independently selected from the group consisting of aliphatic $C_1$ to $C_{24}$ alcohols, monoglyme, diglyme, 1,4-dioxane, furan, polypropyleneglycol (PPG) homopolymers, polypropyleneglycol (PPG) copolymers and mixtures of two or more thereof.

For completeness, it is noted that these conditions i) to iii)—as they apply to Formulae (II) and (II-A)—are not mutually exclusive and a double metal cyanide catalyst for use in the present invention may meet any permutation of these conditions. In particular, the double metal cyanide complex [DMCC] may meet two or desirably three of the aforementioned conditions i) to iii).

The alcohol of these embodiments (L, $L^1$, $L^2$) may either be a saturated or an unsaturated alcohol, the latter "unsaturated alcohol" term encompassing alcohols having: one or more double bond; one or more triple bond; or, a combination of double and triple bonds. Herein, the alcohol (L, $L^1$, $L^2$) desirably contains from 2 to 12 carbon atoms and more particularly from 2 to 10 carbon atoms.

The polypropyleneglycol (PPG) homopolymers, polypropyleneglycol (PPG) copolymers are desirably characterized by a weight average molecular weight (Mw) of from 500 to 2000. As an alternative or supplementary characterization to this molecular weight limitation, said polypropyleneglycol (PPG) copolymers should desirably be either block or random copolymers of ethylene oxide and propylene oxide: exemplary commercial block copolymers include those manufactured under the Pluronics® trade name by BASF.

In accordance with the preferred defined conditions, an exemplary double metal cyanide complex [DMCC] of Formula (II-A) may meet at least one of the following conditions:
i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) L is selected from the group consisting of ethanol, i-propyl alcohol, n-butyl alcohol, i-butyl alcohol, sec-butyl alcohol, tert-butyl alcohol, n-octanol, n-decanol, n-dodecanol, 2-octyldodecanol, undecen-1-ol, polypropyleneglycol (PPG) homopolymers, polypropyleneglycol (PPG) copolymers and mixtures of two or more thereof; wherein said polyproyleneglycol homo- or copolymers are characterized by a weight average molecular weight (Mw) of from 500 to 2000.

In accordance with the preferred defined conditions, an exemplary double metal cyanide complex [DMCC] of Formula (II) may meet at least one of the following conditions:
i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) $L^1$ and $L^2$ are independently selected from the group consisting of ethanol, i-propyl alcohol, n-butyl alcohol, i-butyl alcohol, sec-butyl alcohol, tert-butyl alcohol, n-octanol, n-decanol, n-dodecanol, 2-octyldodecanol, undecen-1-ol, polypropyleneglycol (PPG) homopolymers, polypropyleneglycol (PPG) copolymers and mixtures of two or more thereof; wherein said polyproyleneglycol homo- or copolymers are characterized by a weight average molecular weight (Mw) of from 500 to 2000.

A particular preference may also be acknowledged for double metal cyanide complex [DMCC] of Formula (II-A) in which: (iii) L is tert-butyl alcohol or a polypropyleneglycol (PPG) homopolymer having a weight average molecular weight (Mw) of from 500 to 2000, more preferably tert-butyl alcohol. Additionally or independently, a preference may also be acknowledged for double metal cyanide complexes of Formula (II-A) which meet at least one of the following conditions: i) $M^1$ is equal to $M^3$ and is Zn; $M^2$ is Co; and, ii) X is a halide.

A particular preference may also be acknowledged for double metal cyanide complex [DMCC] of Formula (II) in which: (iii) $L^1$ is tert-butyl alcohol; and, $L^2$ is n-octanol, n-decanol, n-dodecanol, 2-octyldodecanol, undecen-1-ol or a polypropyleneglycol (PPG) homopolymer having a weight average molecular weight (Mw) of from 500 to 2000. Additionally or independently, a preference may also be acknowledged for double metal cyanide complexes of Formula (II) which meet at least one of the following conditions: i) $M^1$ is equal to $M^3$ and is Zn; $M^2$ is Co; and, ii) X is a halide.

As noted herein above, the catalysts of the present invention comprise a hydrophobic support material (Supp). The hydrophobic support material is selected from the group consisting of:
hydrophobic support material characterized by a methanol wettability value of at least 30 vol. %, preferably from 30 to 80 vol. %, more preferably from 30 to 70 vol. %, as determined by the methanol wettability test as described herein;
carbonaceous inorganic solid materials, preferably activated charcoal, carbon black, carbon nanotubes, fullerene, or graphene; or
inorganic solid materials which are isoelectronic with carbon, preferably boron nitride.

According to preferred embodiments, the hydrophobic support material (Supp) which is characterized by a methanol wettability value of at least 30 vol. %, preferably from 30 to 80 vol. %, more preferably from 30 to 70 vol. %, is selected from the group consisting of hydrophobically modified inorganic oxides or hydroxides, hydrophobically modified calcium carbonate, and clay.

The hydrophobically modified inorganic oxides or hydroxides include, without limitation, silicon oxides or hydroxides, aluminum oxides or hydroxides, titanium oxides or hydroxides, zirconium oxides or hydroxides, magnesium oxides or hydroxides, or mixed oxides or hydroxides thereof, or mixtures thereof. In particular, the hydrophobically modified inorganic oxides or hydroxides are selected from hydrophobically modified silica, silicon hydroxide, aluminum oxide, aluminum hydroxide, aluminum silicate, titanium dioxide, titanium silicate, zirconium dioxide, zirconium silicate, or magnesium silicate. More preferably, said hydrophobically modified inorganic oxides or hydroxides comprise or consist of hydrophobic silica or, more particularly, comprise or consist of hydrophobic fumed silica or precipitated nano-scaled silica, most preferably hydrophobic fumed silica.

Said hydrophobically modified inorganic oxides or hydroxides can have a BET surface area of from 50 to 1000 m²/g, preferably from 100 to 600 m²/g, more preferably from 100 to 400 m²/g.

The hydrophobically modified inorganic oxides or hydroxides are preferably obtainable by functionalization with one or more hydrophobic groups using methods known in the art: in this regard, reference may be made inter alia to U.S. Pat. No. 6,344,240. Any suitable reagent can be used for forming the hydrophobic groups including, for example: silanes, preferably organosilazanes, such as hexamethyldisilazane (HMDZ); organosiloxanes, such as hexamethyldisiloxane (HMDS), hexamethylcyclotrisiloxane (D3), octamethylcyclotetrasiloxane (D4), decamethylcyclo-pentasiloxane (D5) and dodecamethylcyclohexasiloxane (D6); organohalosilanes, such as trimethylchlorosilane (TMCS); alkoxysilanes such as dimethoxydimethylsilane; or oleochemical derivatives such as fatty acids, preferably with 12 to 22 carbon atoms, and fatty alcohols, preferably with 12 to 22 carbon atoms. Preferably, the hydrophobic groups formed on the inorganic oxide and/or hydroxide are organosiloxanes. Moreover, the hydrophobic groups are preferably bound to the inorganic oxide and/or hydroxide through oxygen atoms.

The following commercially available hydrophobically modified inorganic oxides may in particular be useful: CAB-O-SIL® TS-530, CAB-O-SIL® TS-610 and, CAB-G-SIL® TS-720 treated fumed silica products available from Cabot Corporation (Mass., USA); HDK® H20 (available from Wacker Chemie AG); and, Aerosil® R104 (available from Evonik Industries).

In another preferred embodiment of the invention, the hydrophobic support material (Supp) is selected from carbonaceous inorganic solid materials, preferably activated charcoal, carbon black, carbon nanotubes, fullerene, or graphene, or inorganic solid materials which are isoelectronic with carbon, preferably boron nitride.

In preferred embodiments, the hydrophobic support material (Supp) is selected from the group consisting of hydrophobically modified silica, preferably hydrophobic fumed silica, hydrophobically modified calcium carbonate, activated charcoal, carbon black, and graphene.

In preferred embodiments, the catalyst composition of the invention contains at least 25 g, preferably at least 50 g and more preferably at least 100 g of hydrophobic support material per 100 g of the unsupported complex. Further, in preferred embodiments, the catalyst composition contains a maximum of 5000 g, more usually a maximum of 4000 g or even 3000 g of hydrophobic support material per 100 g of the unsupported complex. For instance, the catalyst composition may viably contain from 100 to 1000 g or from 250 to 750 g of hydrophobic support material per 100 g of the unsupported complex.

Broadly, the supported catalyst of Formula (I) above is obtainable or is obtained by mixing: at least one organic complexing agent; said hydrophobic support (Supp); and, at least one double metal cyanide compound.

The supported catalyst according to the present invention can have an average particle size of from 300 nm to 2500 nm, preferably 500 nm to 2000 nm, more preferably 700 nm to 1650 nm, in particular 800 nm to 1500 nm, as determined by light scattering method. The size distribution of catalyst particles is measured by means of photon correlation spectroscopy with Zetasizer Nano 2390 (MALVERN Instruments Ltd., UK) according to DIN ISO 13321. Photon Correlation Spectroscopy (PCS) is a dynamic scattered light method used to determine the mean hydrodynamic particle diameter and polydispersity index as a measure of the width of the distribution, Calibration of the PCS size measurement is performed according to DIN EN ISO 13485 according to specified procedures using Nanosphere® size standards from Duke Scientific Corp., USA. The volume-average particle size of catalyst particles is based on values obtained by measuring catalyst particles dispersed in methanol by means of a light scattering method.

More particularly, the method for producing the supported catalyst of Formula (I) as defined herein comprises the steps of i) mixing in an aqueous medium
   a) at least one complexing agent, i.e., a complexing agent (L) or at least two organic complexing agents ($L^1$, $L^2$), as applicable;
   b) the hydrophobic support (Supp);
   c) at least one salt of the general formula (IIa);

$$M^1_d X_g \quad \text{(IIa)}$$

where $M^1$ is a Zn, Fe, Co, Mn, Cu, Sn, Pb or Ni ion, X is an anion, preferably halide, and d and g are integers >0 and assume values such that the salt $M^1_d X_g$ is electroneutral; and, d) at least one complex of the general formula (IIb)

$$M^3_h[M^2(CN)_e]_f \quad \text{(IIb)}$$

where $M^3$ is an alkali metal ion, preferably potassium, $M^2$ is a Co, Cr, Mn, Ir, Rh, Ru, V or Fe ion and h, e and f are integers >0 and assume values such that the complex $M^3_h[M^2(CN)_e]_f$ is electroneutral;

ii) washing the obtained catalyst with an aqueous solution;

iii) drying the washed catalyst.

The mixing operation yields an aqueous suspension comprising the precipitated [DMCC] catalytic complex. The suspension may then be subjected to solid-liquid separation and the obtained solid subjected to at least one purification step.

In an important embodiment of this method, $M^3$ is potassium and X is halide. In addition, it is preferred that the total molar amount of the salt(s) of Formula (IIa) to be mixed is in excess of the total molar amount of the complex(es) of Formula (IIb): a stoichiometric excess of the salt(s) of Formula (IIa) of at least 40 mol. % or at least 50 mol. %, based on the molar amount of the complex(es) of Formula (IIb) may be mentioned as desirable.

There is no particular intention to limit what is meant by the term mixing in the context of this method: it is intended to encompass any means of bringing the given feedstocks [a) to d)] into contact in such a way that these can undergo a chemical reaction with one another or enter into a physical interaction with one another. Desirably, the mixing will be performed under the high shear forces generated by, for instance, vigorous stirring, rotor-stator mixers or by dispersion through one or more flat jet nozzles, Levos nozzles, Bosch nozzles and the like. The specific mixing method employed should, however, suppress the formation of foam during the mixing operation.

In that mixing operation, it is considered that the organic complexing agents (L, $L^1$, $L^2$) may be: added within an aqueous solution of the metal salt (IIa); added within an aqueous solution of the metal cyanide salt (IIb); and/or, added directly to the suspension after precipitation of the [DMCC] catalytic complex.

After the mixing step, the supported catalyst is then isolated from the suspension by centrifugation, filtration or analogous known techniques. The so-isolated catalyst is washed at least once with an aqueous solution of the selected organic complexing agent(s) to remove water soluble by-products: the or each washing step can feasibly include the re-suspension of the catalyst and the renewed isolation of that solid by, for instance, filtration or centrifugation. The amount of organic complexing agent(s) in each aqueous wash solution should in toto be from 40 to 80 wt. %, based on the total weight of aqueous wash solution.

Subsequent to the aqueous washing steps, the isolated catalyst may optionally be treated with a non-aqueous wash solution comprising said organic complexing agent(s). The washed catalyst is then dried, optionally after pulverization, at a temperature of from 20 to 100° C. and under a reduced pressure of, for instance, from 0.1 to 1013 mbar.

According to another embodiment of the invention, the method for producing the supported catalyst comprises the steps of i) mixing in an aqueous medium a) at least one complexing agent, i.e., a complexing agent (L) or at least two organic complexing agents ($L^1$, $L^2$), as applicable; c) at least one salt of the general formula $M^1{}_dX_g$ (IIa) as defined herein; and d) at least one complex of the general formula $M^3{}_h[M^2(CN)_e]_f$ (IIb) as defined herein, ii) washing the obtained catalyst with an aqueous solution, iii) drying the washed catalyst, wherein b) said hydrophobic support (Supp) is added to the obtained catalyst during or after the purification, for example before or during the washing step ii) or after the drying step iii), preferably after the drying step iii). In case the hydrophobic support (Supp) is added during the washing step, the obtained supported catalyst is then dried, for example by spray drying or belt drying, at a temperature of from 20 to 100° C. In case the hydrophobic support (Supp) is added after the drying step, the mixture of the dried DMCC and the hydrophobic support (Supp) is carefully pulverized under friction forces using a conventional grinding machine such as a pebble mill, a colloid mill, or a mortar grinder.

As noted above, the present invention also entails the use of the above defined, supported double metal cyanide complexes as catalysts for the polymerization of epoxide monomers. For completeness, this polymerization is intended to encompass: the homo-polymerization of an epoxide monomer; the copolymerization of at least two different epoxide monomers; and, the copolymerization of at least one epoxide monomer with a non-epoxide, cyclic monomer and/or carbon dioxide. The above defined supported double metal cyanide catalysts thereby enable the efficient and economical synthesis of polyethers, polycarbonates or polyether-polycarbonates.

In a particular embodiment of these recited uses, there is provided a method for producing a functionalized polymer or copolymer, said method comprising the steps of:
  a) providing an initiator, said initiator comprising or consisting of an active hydrogen-containing compound capable of alkoxylation by an epoxide compound;
  b) providing a supported catalyst as defined herein above and in the appended claims; and,
in the presence of said initiator and said supported catalyst, performing a ring opening polymerization of at least one epoxide monomer or co-polymerization of carbon dioxide and at least one epoxide monomer.

In any of the aforementioned polymerization processes, the amount of supported catalytic complex employed should be sufficient to provide a reasonable polymerization rate but it should be minded such catalysts are expensive and using lower amounts thereof can obviate the need to remove catalyst residues from the product. Without intention to limit the present invention, effective polymerizations have been conducted where the amount of the supported catalytic complex [DMCC] is from 10 ppm to 5000 ppm, in particular from 50 to 500 ppm, based on the weight of the homo- or copolymer product.

Without intention to limit the polymerization processes of present invention, illustrative monoepoxide monomers include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide monomers for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an important embodiment, the monoepoxide monomer conforms to Formula (III) herein below:

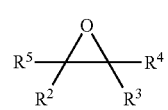

(III)

wherein:
  $R^2$, $R^3$, $R^4$ and $R^5$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^3$ and $R^4$ is not hydrogen.

It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, preference is given to using at least one monoepoxide monomer selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide. It is particularly preferred if propylene oxide is used as a monomer: this statement of particular preference is intended to encompass said propylene oxide being either one of the epoxide monomers subjected to polymerization or the sole epoxide monomer.

Again, without intention to limit the polymerization processes of present invention, suitable polyepoxide monomers may be liquid, solid or in solution in solvent. Further, such polyepoxide compounds should have an epoxy equivalent weight of from 100 to 700 g/eq, for example from 120 to 320 g/eq. And generally, diepoxide compounds having epoxy equivalent weights of less than 500 or even less than 400 are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid C1-C18 alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

And examples of highly preferred polyepoxide compounds include: bisphenol-A epoxy resins, such as DER™ 331, and DER™ 383; bisphenol-F epoxy resins, such as DER™ 354; bisphenol-NF epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

Whilst it is does not represent a preferred embodiment, the present invention does not preclude the epoxide monomer(s) being co-polymerized with one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the monomers.

Polymerization Processes

Whilst there is certainly no intention to preclude either batch-wise or continuous performance of the polymerization—as described in U.S. Pat. Nos. 5,777,177 and 5,689,012—the polymerization reactions are most suitably performed as semi-batch processes.

The polymerization reaction can be performed in any type of vessel that is suitable for the pressures and temperatures described below. In the preferred semi-batch process, the vessel should have one or more inlets through which at least the epoxide monomer(s) can be introduced during the reaction. A modified semi-batch process, so-called continuous addition of starter (CAOS) system, in which starter such as polypropylene glycol or dipropylene glycol is added continuously and simultaneously with epoxide monomer(s) can be used. In the less desired continuous process, a reactor vessel should contain at least one outlet through which a portion of the partially polymerized reaction mixture could be withdrawn. That aside, exemplary vessels for continuous or semi-batch operations include but are not limited to: tubular reactors; loop reactors; and, continuous stirred tank reactors (CTSR). Any reactor should, of course, be equipped with a means for providing or removing heat so that the temperature of the polymerization mixture can be maintained within the desired range: there is no intention to limit such means but examples include jacketing for thermal fluids and internal and/or external heaters.

At the commencement of the polymerization process, the supported catalyst, initiator and, optionally, a Lewis acid are charged into the reaction vessel. As is known in the art, the initiator is an active hydrogen-containing compound capable of alkoxylation by epoxide in the presence of said supported catalyst: the initiator is selected based on the desired functionality and molecular weight of the polyether, polycarbonate or polyether-polycarbonate product. Conventionally, the initiator will be oligomeric or polymeric in character and have a number average molecular weight (Mn) in the range from 100 to 10000 and a functionality (number of active hydrogens per molecule) of from 2 to 8. Diols and higher functionality polyols are particularly preferred for use as initiators.

In the preferred semi-batch process, the supported catalyst complex may undergo a preliminary heating step, in the absence of epoxide monomer(s), at a temperature of from 50 to 220° C., for instance from 75 to 180° C. That preliminary heating step is conducted in an inert atmosphere and is typically but, not necessarily, conducted under sub-atmospheric pressure. The preliminary heating is, moreover, usually conducted for a period of at least 10 minutes: a period of from 10 to 30 minutes might be mentioned for illustrative purposes.

After this preliminary heating, the temperature of the vessel is, if necessary, adjusted to the polymerization temperature and a portion of the epoxide monomer and, if applicable, a fraction of the carbon dioxide is introduced.

When the supported catalyst complex [DMCC] has become activated—typically indicated by a drop of internal reactor pressure—further monomer is fed into the reactor under the polymerization conditions discussed herein below.

Whilst additional supported catalyst may certainly be added during the course of the monomer, carbon dioxide or reactant addition, it is conventional in a semi-batch process for the entire amount of catalyst to be added at the start of the process. Moreover, although it is highly desirable to have the Lewis acid present during initiation (catalyst activation), it is also conceivable for the Lewis acid to be added after initiation. Additional portions of Lewis acid may also be introduced as the polymerization progresses, that is during the addition of the epoxide(s).

The homo- or copolymer product obtained in the described synthesis steps will commonly contain in toto up to 1% by weight, based on the weight of said product, of: un-reacted epoxide monomer(s); organic impurities; and, water. Volatile impurities and moisture should be flashed or stripped from the (co-)polymer product. The (co-)polymer products also contain Lewis acids and catalyst residues: whilst it is typical to leave these residues in the product—since they are not expected to interfere with the performance of the polymers in many end-use applications, particularly if present at relatively low levels they may conversely be removed if desired using separation and purification methods known in the art: mention in this regard may be made of adsorption, ion-exchange, extraction, re-precipitation, evaporation and chromatography. Where it is intended that the (optionally purified) reaction product be stored upon production, the polymers should be disposed in a vessel with an airtight and moisture-tight seal.

Polymerization of Epoxides without $CO_2$

The homo-polymerization of epoxide monomers, the copolymerization of two or more epoxide monomers, and the co-polymerization of epoxide monomers with further cyclic monomers should be performed under anhydrous conditions and in the absence of any compound having an active hydrogen atom, save for the deliberate inclusion of the initiating compound. Exposure to atmospheric moisture may be avoided by providing the reaction vessel with an inert, dry gaseous blanket. Whilst dry nitrogen, helium and argon may be used as blanket gases, precaution should be used when common nitrogen gases are used as a blanket, because such nitrogen may not be dry enough on account of its susceptibility to moisture entrainment; the nitrogen may require an additional drying step before use herein.

The polymerization temperature is typically at least 40° C. and preferably at least 60° C. Whilst the reaction temperature may be 200° C. or higher, it is preferred that the temperature does not exceed 190° C. or even 180° C. in order inter alia: to maintain workable reactor pressures; to minimize the formation of volatile impurities or other by-products; and, to maintain adequate catalyst activity without deactivating or decomposing the catalyst.

The process pressure is not critical: as such, the polymerization reaction can be run at sub-atmospheric, atmospheric, or super-atmospheric pressures but pressures at or slightly above atmospheric pressure are preferred.

The epoxide monomer(s), and any further cyclic monomers optionally used, may be fed to the reaction vessel on demand by continuously pressurizing the reactor with the monomers to a predetermined internal reactor pressure. During the epoxide feed stage, the concentration of un-reacted epoxide in a semi-batch reactor should desirably be maintained at a level of from 0.01 to 10 wt. % or from 0.1 to 5 wt. %, based on the weight of the polymerization mixture. The epoxide feed is then continued until enough has been introduced to enable the target product molecular weight to be attained. After the epoxide feed is completed, the reaction mixture may be maintained at the polymerization temperature to promote the consumption of any remaining monomers.

Polymerization of Epoxides with $CO_2$

Carbon dioxide, which is subjected to copolymerization with an epoxide, is introduced into the reaction vessel in a gaseous form. In addition, the copolymerization reaction is preferably carried out under an inert atmosphere in order to exclude oxygen from the vessel. As such, carbon dioxide coexists with an inert gas such as nitrogen, helium or argon in the reaction vessel. The partial pressure of carbon dioxide in the reaction vessel is generally from 0.1 to 6 MPa but is preferably from 1.0 to 3.0 MPa. This partial pressure should equate to a molar ratio of epoxide monomer(s) to carbon dioxide of from 1:0.1 to 1:10 commonly or from 1:0.5 to 1:3.0 in more preferred embodiments. A desirable molar ratio of from 1:1.0 to 1:2.0 might be noted.

The copolymerization reaction of said at least one epoxide monomer with carbon dioxide is conventionally carried out in the presence of an inert liquid organic solvent. Suitable inert solvents for the copolymerization are organic solvents selected from the group consisting of: esters; ketones; halogenated hydrocarbons; alkanes; alkenes; and, aromatic hydrocarbons. Exemplary solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, n-heptane, hexane, isobutyl acetate, isooctane, isopropyl acetate, methyl ethyl ketone, tetrahydrofuran or tetrachloroethylene or mixtures of two or more of the recited solvents.

And in said co-polymerization of epoxide monomers with carbon dioxide, the use of co-catalysts is not precluded and such co-catalysts may generally be used in an amount up to 1000 ppm, based on the weight of the copolymer product. Without intention to limit the present invention, suitable co-catalysts may include sulfur and/or at least one compound containing one or more active hydrogen atoms. And as exemplary co-catalysts, which may be used alone or in combination, may be mentioned: water; salts containing water of crystallization selected from halides, nitrates, sulfates, pyrophosphates, phosphates, carbonates, borates or acetates of magnesium, calcium, zinc, aluminium or cadmium; inorganic acids, such as hydrogen sulfide and hydrogen polysulfides; monols or poylols, such as methanol, 1,4-butanediol, trimethylol propane and pentaerythritol; ketones, such as acetone, methyl ethyl ketone and acetylacetaone; aldehydes, such as acetaldehyde and propionaldehyde; organic acids, such as oxalic acid and isophthalic acid; polyamines, such as piperazine, ethylenediamine and hexamethylenediamine; primary mono-amines, such as ethylamine, propylamine and aniline; ammonia; hydrazines; esters or amides, such as dimethyl malonate and acetamide; nitrile compounds, such as acetonitrile and propionitrile; nitro compounds containing an active hydrogen, such as nitromethane and nitroethane; and, phenolic compounds such as resorcin, hydroquinone, aminophenol and novolac resins.

The polymerization temperature is typically in the range from 0 to 60° C., for example from 20 to 40° C.: performance at room temperature is not therefore excluded. The (alternating) copolymerization reaction can continue until the epoxide monomer(s) are completely consumed, or until sufficient progression of the reaction is established after from 2 to 20 hours. Thereafter the reaction may be terminated by removal of the carbon dioxide gas and/or with a suitable reaction terminator. The skilled reader will be able to select conventional reagents for terminating the polymerization reaction for polycarbonate but mention in this regard may be made of compounds having an active proton such as methanol, water and hydrochloric acid.

Compositions and Applications of the Homo- and Co-Polymers

By way of an important example, the above-described method may yield a hydroxyl functionalized polymer or copolymer through selection of a mono-ol or polyol initiator and, in particular, a polyol initiator having a number average molecular weight (Mn) of from 100 to 10000 and a functionality (number of active hydrogens per molecule) of from 2 to 8. However, irrespective of the exact functionalization thereof, the functionalized polymer or copolymer derived from this method may be used as a reactive component for coating, sealant or adhesive compositions based on active hydrogen reactive compounds.

The homo- or copolymers derived in the above described polymerization processes may possess a number average molecular weight (Mn) of from 1000 to 60000 g/mol, preferably from 2000 to 40000 g/mol. Moreover, the copolymers may be characterized by a polydispersity index (PDI) in the range from 1.0 to 1.5, preferably from 1.0 to 1.2.

Where a hydroxyl functional initiator is employed, the polyether polyols produced by operation of the process of the invention may be characterized by at least one of: a nominal functionality of from 2 to 8, in particular from 2 to 4; an unsaturation of at most 0.025 meq/g, preferably at most 0.020 meq/g; and, a hydroxyl number of from 10 to 80 mg KOH/g.

It is anticipated that the functionalized polyether, polycarbonate or polyether-polycarbonate polymers of the present invention per se may find utility as a curable, crosslinkable or otherwise reactive component of a coating composition, a sealant composition or an adhesive composition, such as a pressure sensitive adhesive composition. In particular, hydroxyl-functionalized polyether, polycarbonate or polyether-polycarbonate polymers may constitute one component of a composition which further comprises at least one compound having at least one hydroxyl group-reactive functionality preferably selected from isocyanate groups, cyano groups, melamine groups, epoxy groups, acrylate groups, methacrylate groups, ester groups, carbonate groups, cyclocarbonate groups, carboxylic acid groups or anhydride groups.

In an illustrative embodiment of the present invention, there is provided a two-component (2K) polyurethane composition comprising component (I) and component (II), wherein component (I) comprises a polyisocyanate and component (II) comprises a hydroxyl functional polymer obtained in accordance with the above described process. The composition may be further characterized in that the molar ratio of isocyanate groups (NCO) in component (I) to hydroxyl groups (OH) in component (II) is in the range from 0.8:1 to 2.5:1, preferably from 1.3:1 to 1.8:1.

A composition, such as a coating, sealant or adhesive composition comprising homo- or copolymers obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are catalysts, plasticizers, stabilizers, antioxidants, fillers, reactive diluents, drying agents, adhesion promoters and UV stabilizers, fungicides, flame retardants, rheological adjuvants, color pigments or color pastes, and/or optionally also, to a small extent, solvents.

A "plasticizer" for the purposes of this invention is a substance that decreases the viscosity of the composition and thus facilitates its processability. Herein the plasticizer may constitute up to 40 wt. % or up to 20 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include sterically hindered phenols and/or thioethers and/or substituted benzotriazoles and/or amines of the hindered amine light stabilizer (HALS) type. It is preferred in the context of the present invention that a UV stabilizer that carries a silyl group—and becomes incorporated into the end product upon crosslinking or curing—be used: the products Lowilite™ 75, Lowilite™ 77 (Great Lakes, USA) are particularly suitable for this purpose. Benzotriazoles, benzophenones, benzoates, cyanoacrylates, acrylates, sterically hindered phenols, phosphorus and/or sulfur can also be added.

As noted, the compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 m$^2$/g. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 m²/g, in particular from 110 to 170 m²/g, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 µm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 1 to 80 wt. %, and more preferably from 5 to 60 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 and 5 wt. %, based on the total weight of the composition.

Various features and embodiments of the disclosure are illustrated in the appended drawings and are described in the following examples, which examples are intended to be representative and not limiting.

BRIEF DESCRIPTION OF THE DRAWINGS

FIG. 8 provides a comparison of the first order rate constant for the catalytic system obtained in Example A with the first order rate constants of the catalytic systems of Examples J and K. The rate constants were determined by on-line monitoring of the consumption of propylene oxide (PO).

EXAMPLES

Preparation of DMC Catalysts

Figure 1:
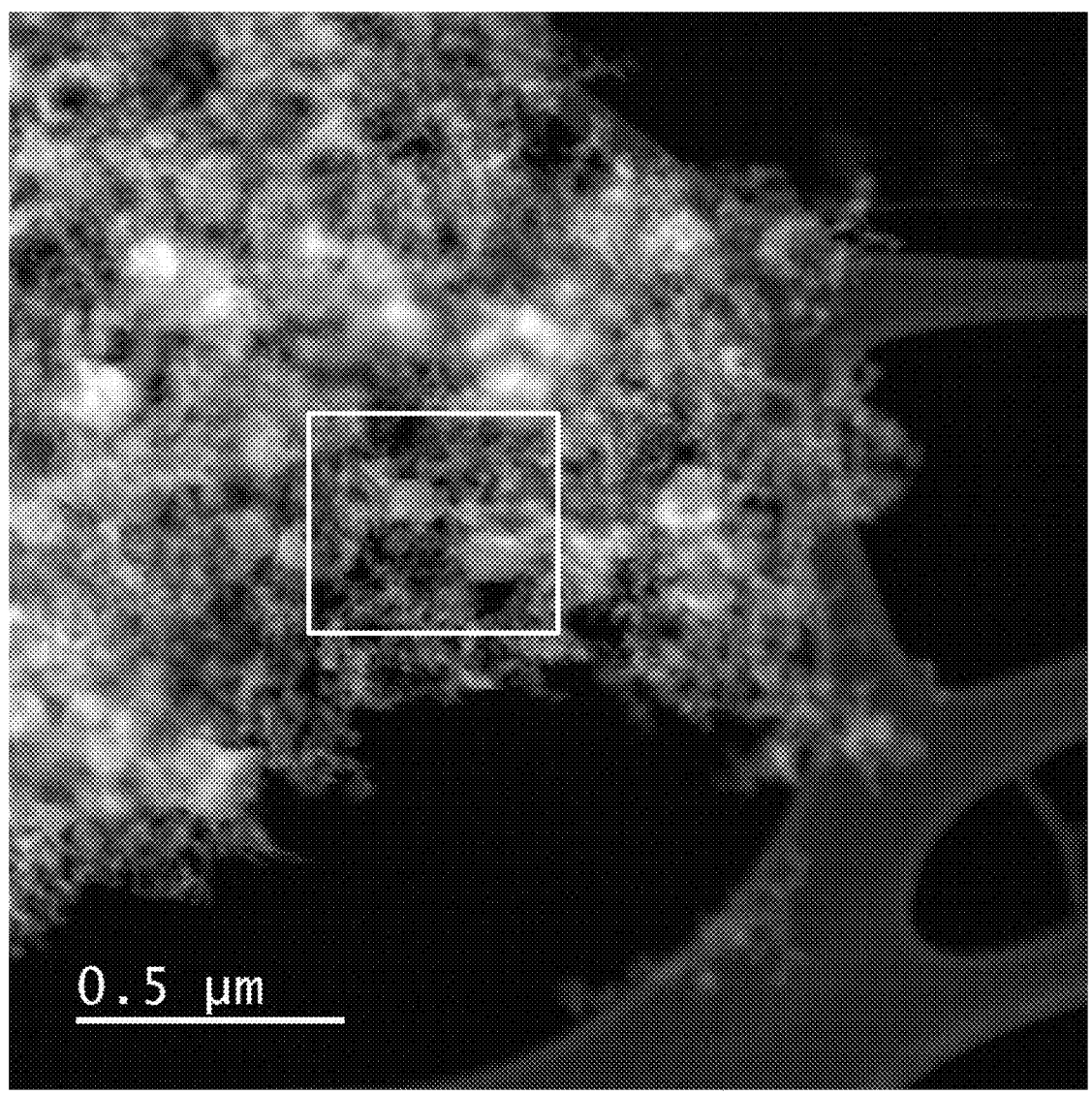
FIG. 1 appended hereto is a High Angle Annular Dark Field (HAADF) transmission electron micrograph (TEM) of the supported catalyst prepared in accordance with Example A herein below. To prepare the TEM, solid samples of the catalyst were disposed, without any pretreatment, on a holey, carbon-supported Cu-grid (Mesh 300) and transferred to the microscope. The TEM measurements were performed at 200 kV with an aberration-corrected JEM-ARM200F (JEOL, Corrector: CEOS). The microscope is equipped with a JED-2300 (JEOL) energy-dispersive x-ray-spectrometer (EDXS) and an Enfinum ER (GATAN) with DualEELS for chemical analysis. The aberration corrected STEM imaging (HAADF) was performed under the following conditions: spot size of approximately 0.1 nm; a convergence angle of 30-36°; and, collection semi-angles of 90-170 mrad.
Figure 2:
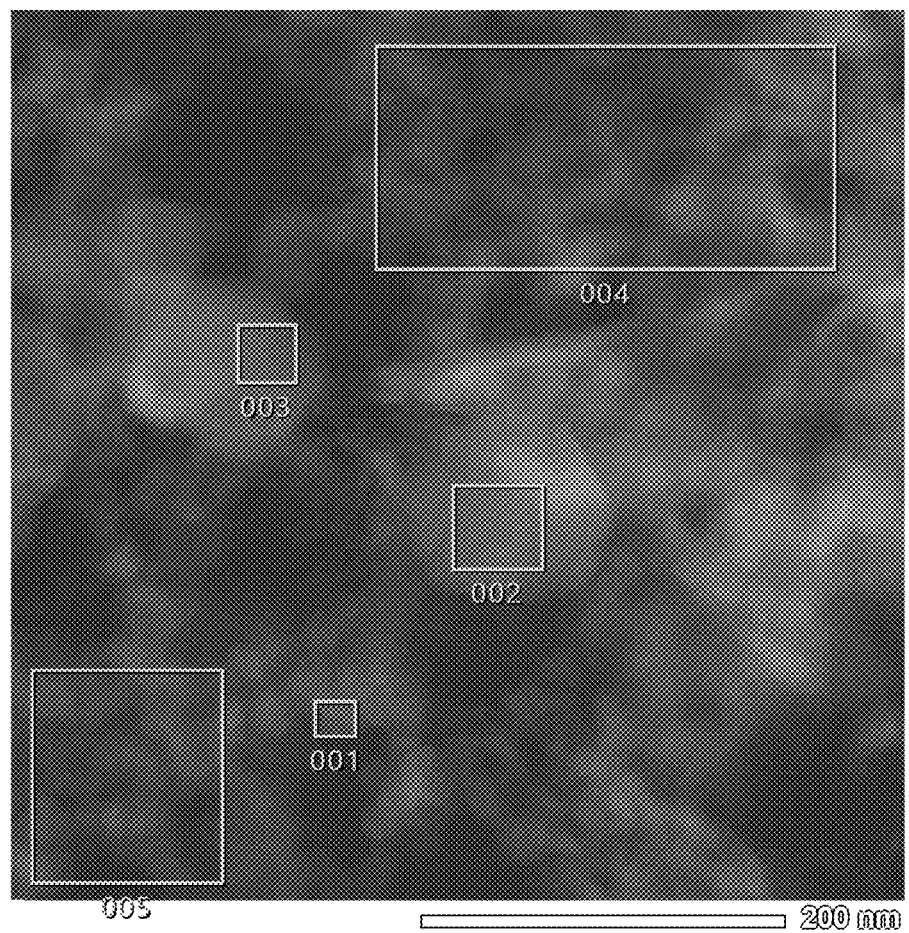
FIG. 2 appended hereto is the expanded insert of FIG. 1.
Figure 3:
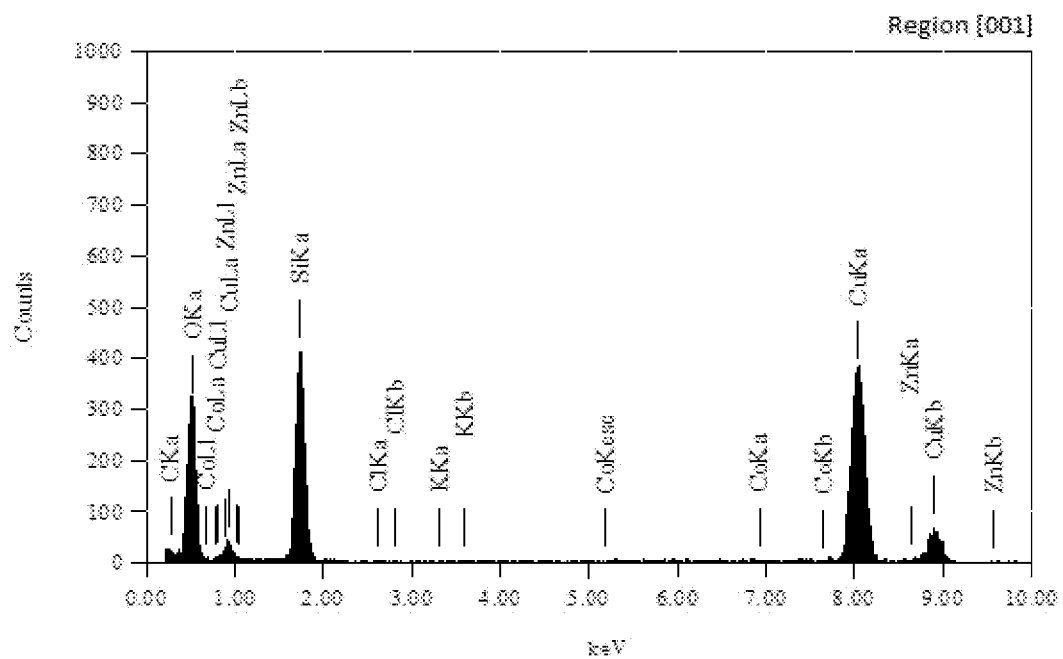
FIG. 3 is the corresponding Energy-dispersive X-ray spectra (EDXS) of the highlighted region [001] of FIG. 2.
Figure 4:
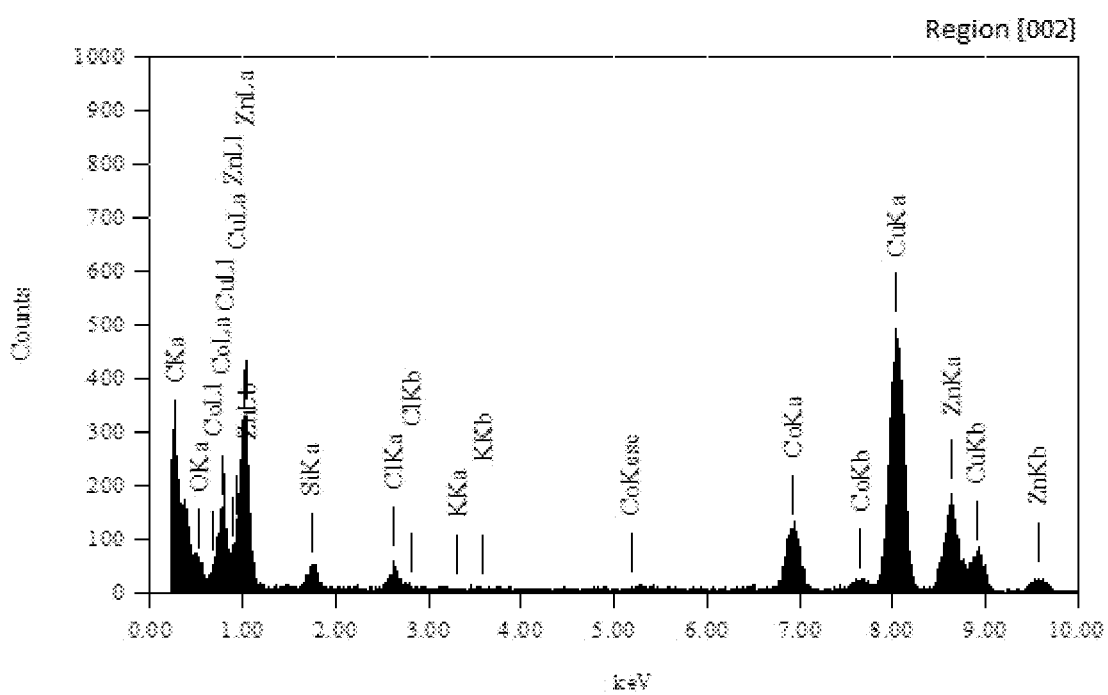
FIG. 4 is the corresponding Energy-dispersive X-ray spectra (EDXS) of the highlighted region [002] of FIG. 2.
Figure 5:
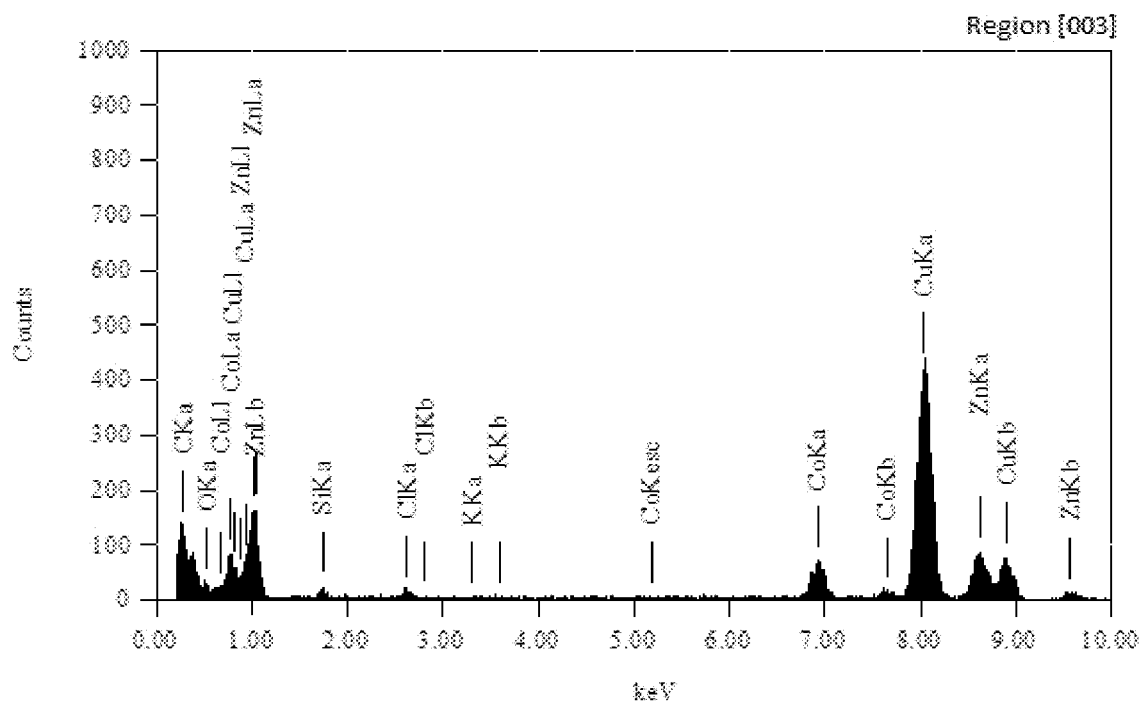
FIG. 5 is the corresponding Energy-dispersive X-ray spectra (EDXS) of the highlighted region [003] of FIG. 2.
Figure 6:
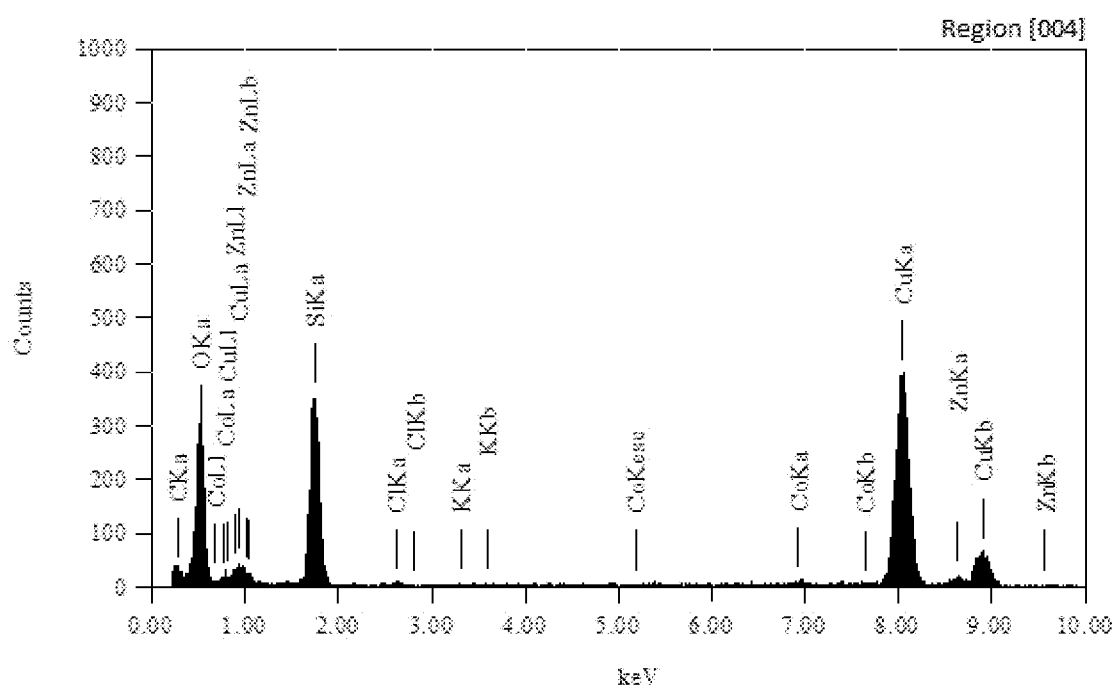
FIG. 6 is the corresponding Energy-dispersive X-ray spectra (EDXS) of the highlighted region [004] of FIG. 2.
Figure 7:
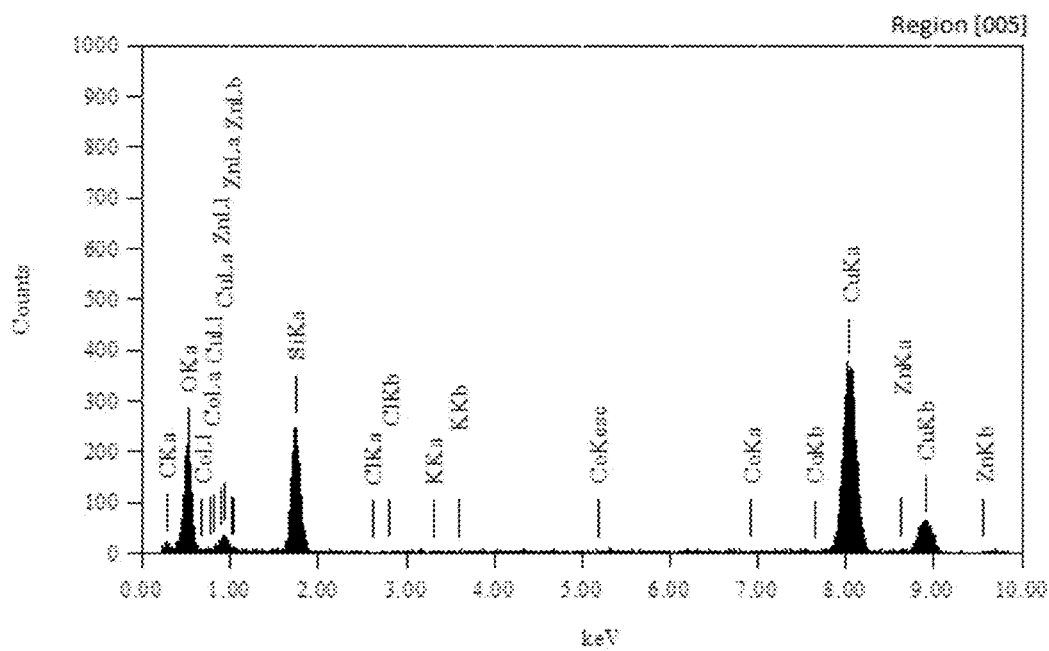
FIG. 7 is the corresponding Energy-dispersive X-ray spectra (EDXS) of the highlighted region [005] of FIG. 2.

The following commercial products were utilized in the Examples:
i) Eutanol® G is a medium spreading emollient available from BASF SE. The product has a hydroxyl value of 175-190 mg KOH/g, a refractive index (20° C.) of 1.4535-1.4555, and a density (20° C.) of 0.835-0.845 g/cm³.
ii) Aerosil® 104 is hydrophobic fumed silica available from Evonik Industries.
iii) Aerosil® 150 is hydrophilic fumed silica available from Evonik Industries.
iv) HDK® H20 is hydrophobic fumed silica available from Wacker Chemie AG.
v) HDK® N20 is hydrophilic fumed silica available from Wacker Chemie AG.
vi) Carbital 110S is fine ground calcium carbonate coated with fatty acids available from Imerys.
vii) Carbital 110 is fine ground calcium carbonate available from Imerys.
viii) Hakuenka® CCR-S is a precipitated calcium carbonate coated with fatty acids available from Shiraishi Omya GmbH.

The methanol wettability value (vol. %) of the materials listed in Table 1 below was measured by the following methanol wettability test, which is an analytic test method used for the determination of hydrophobicity of Aerosil® product by Evonik Industries (http://www.aerosil.com/product/aerosil/en/services/downloads/Pages/test-methods.aspx as of August 2014).

Methanol Wettability Test

Procedure: Into at least 4 transparent centrifugal tubes (each 80 ml) 1.2 g (±0.005 g) of samples are weighed first. 48.0 ml of a certain methanol/water mixture (of 10 percent by volume to 90 percent by volume methanol, in 5 percent steps) are added to each weighed portion. The tubes were closed and shaken for 10 seconds by hand and 30 seconds in a horizontal shaker, level 12 (Rütteltisch F. Gerhardt LS10). The samples are subsequently centrifuged at 2500/min at 23° C. for 5 minutes in a laboratory centrifuge. Evaluation takes place after 5 minutes of recondition.

Evaluation: The methanol wettability value of each sample (supporting material) was defined by the lowest percentage of methanol (vol. %) in a methanol/water mixture, that shows still a quantitative wetting of all support materials, meaning that 100% of the support material were sedimented (no support material in the solution or on the surface of the solution). The lowest percentage of methanol define and quantify the methanol wettability value in vol. %.

TABLE 1 quantification of the hydrophobicity of the support material by
the methanol wettability test described herein

| Support material | Methanol wettability value (vol. %) | Methanol/Water in vol. % |
| --- | --- | --- |
| Aerosil ® 104 | 60 | 60/40 |
| HDK ® H20 | 65 | 65/35 |
| HDK ® N20 | 20 | 20/80 |
| Aerosil ® 150 | 20 | 20/80 |
| Hakuenka ® CCR-S | 70 | 70/30 |
| Carbital 110 S | 65 | 65/35 |
| Carbital 110 | 10 | 10/90 |

Example A: To a solution of 3 g (9 mmol) of potassium hexacyanocobaltate in 150 ml of distilled water, 10 ml tert-butyl alcohol, 0.1 g Eutanol® G and 3 g of Aerosil® R 104 were added under vigorous stirring (20000 rpm). Immediately afterwards, a solution of 20 g (147 mmol) of zinc chloride in 100 ml of distilled water and 20 ml tert-butyl alcohol was added to the Aerosil-mixture with vigorous stirring (20000 rpm). The intensity of stirring was reduced (8000 rpm) but continued for 20 minutes. The obtained solid was isolated by centrifugation. The solid was then stirred (10,000 rpm) for 20 minutes with a mixture of 50 ml of tert-butyl alcohol, 50 ml of distilled water and 0.1 g of Eutanol® G and again isolated by centrifugation. The resultant solid was stirred once again (8000 rpm) for 20 minutes with a mixture of 75 ml tert-butyl alcohol and 0.01 g of Eutanol® G and isolated by centrifugation. Thereafter, the resultant solid was stirred again (8000 rpm) for 20 minutes with a solution of 100 ml tert-butyl alcohol and 0.05 g of Eutanol® G. After filtration, the catalyst was dried to constant weight at 50° C. under vacuum.

Example B: The same procedure was used as described in example A except that Aerosil® 104 was added in the last washing step.

Example C: The same procedure was used as described in example A except that Aerosil® 104 was used without Eutanol® G.

Example D: The same procedure was used as described in example A except that Aerosil® 150 was used instead of Aerosil® 104.

Example E: The same procedure was used as described in example A except that HDK® H₂O was used instead of Aerosil® 104.

Example F: The same procedure was used as described in example A except that HDK® N20 was used instead of Aerosil®104.

Example G: The same procedure was used as described in example A except that Carbital 110 S was used instead of Aerosil®104.

Example H: The same procedure was used as described in example A except that Carbital 110 was used instead of Aerosil®104.

Example I: The same procedure was used as described in example A except that Hakuenka® CCR-S was used instead of Aerosil®104.

Example J: A DMC catalyst using Eutanol® G without a silica-based compound was prepared. 1.5 g of potassium hexacyanocobaltate was dissolved in 50 ml of distilled water in a beaker. A solution of 0.35 mmol of Eutanol® G and 5 ml of tert-butyl alcohol is added thereto (Solution 1). 10 g of zinc chloride is dissolved in 50 ml of distilled water and 10 ml of tert-butyl alcohol (Solution 2). Solutions 1 and 2 were combined using a dispersing system for mixing. After stirring for 20 minutes the mixture was centrifuged. The solid was then stirred (10,000 rpm) for 20 minutes with a mixture of 50 ml of tert-butyl alcohol, 50 ml of distilled water and 0.1 g of Eutanol® G and again isolated by centrifugation. The resultant solid was stirred once again (8000 rpm) for 20 minutes with a mixture of 75 ml tert-butyl alcohol and 0.01 g of Eutanol® G and isolated by centrifugation. Thereafter, the resultant solid was stirred again (8000 rpm) for 20 minutes with a solution of 100 ml tert-butyl alcohol and 0.05 g of Eutanol® G. After filtration, the solid cake was re-suspended in a 100% tert-butyl alcohol washing solution, homogenized for 20 minutes and centrifuged: the resulting precipitate was dried to constant weight under vacuum at 50° C.

Example K: A DMC catalyst according to Example 1 of EP 0700949 A2. 8.0 g potassium hexacyanocobaltate was dissolved in 140 mL deionized water in a beaker (Solution 1). 25 g of zinc chloride 25 g was dissolved in 40 ml of deionized water in a second beaker (Solution 2). A third beaker contains Solution 3: a mixture of deionized water (200 mL), tert-butyl alcohol (2 mL), and polyol (2 g of a 4000 mol. wt. poly(oxypropylene) diol). Solutions 1 and 2 were mixed together using a disperser. Immediately, Solution 4, a 50/50 (by volume) mixture of tert-butyl alcohol and deionized water (200 ml total) was added to the zinc hexacyanocobaltate mixture, and the product was stirred for 10 min. Solution 3 (the polyol/water/tert-butyl alcohol mixture) was added to the aqueous slurry of zinc hexacyanocobaltate, and the product was stirred (700 rpm) for 3 min. The mixture was centrifuged to isolate the solids. The solid cake was reslurried in tert-butyl alcohol (140 ml), deionized water (60 ml), and additional 4000 mol. wt. poly(oxypropylene) diol (2.0 g), the mixture was homogenized for 10 min. and centrifuged as described above. The solid cake is reslurried in tert-butyl alcohol (200 ml) and additional 4000 mol. wt. poly(oxypropylene) diol (1.0 g), homogenized for 10 min., and centrifuged. The resulting solid catalyst was dried under vacuum at 50° C. to constant weight. The yield of dry, powdery catalyst was 12.02 g.

Example L: The same procedure was used as described in example A except that activated charcoal powder from Sigma-Aldrich (Product no. 05105) (Cas no. 7440-44-0) was used instead of Aerosil®104.

General Methods for the Propoxylation Reaction a) Synthesis of PPG (Mw 3400 g/Mol) in a 100 ml Steel-Autoclave 27 g of a polypropylene glycol diol (Mw 2000 g/mol) was charged in a 100 ml stirring autoclave together with 0.015 g of the selected (DMC) catalyst. The mixture was stirred for 1 hour at 105° C. under reduced pressure (<10 mbar) to remove moisture and volatile contaminants. Thereafter it was stirred under heating to 120° C. in an Argon atmosphere. After reaching this temperature, propylene oxide (0.1 mol) was added in one portion until the total internal pressure increased to 4.5 bar. An increase of temperature and an accelerated drop in the reactor pressure was soon noted, indicating catalyst activation. The reactor was further stirred until the pressure reached 0.5 bar.

b) Synthesis of PPG (12000 g/Mol) in a 1 L Steel-Autoclave 83 g of a propylene glycol diol (Mw 2000 g/mol) was charged in a 1 L steel autoclave together with 0.015 g of the selected (DMC) catalyst (30 ppm based on the weight of the desired product). The mixture was stirred for 1 hour at 105° C. under reduced pressure (<10 mbar) to remove moisture and volatile contaminants. Thereafter it was stirred under heating to 120° C. in an Argon atmosphere. After reaching this temperature and an initial pressure of 0.5 bar, 10 g propylene oxide (PO) was dosed in order to induce the start of the reaction. The internal pressure increased to 2.8 bar. Further propylene oxide was, however, only added when an accelerated pressure drop was observed in the reactor, indicative of the catalyst having been activated: the remainder of the propylene oxide (420 g) was added continuously.

After addition of all the propylene oxide and following a 1 hour post-reaction period at 120° C., the volatile components were distilled off at 90° C. under reduced pressure (<10 mbar) and the mixture then cooled to room temperature.

The propoxylation reaction was followed by means of a time/conversion curve, specifically propylene oxide consumption [g] versus reaction time [min]. The induction time ($t_{induction}$) was determined from the point of interception of the tangent to the steepest point of the time/conversion curve with the extended base line of the curve. Table 2 characterizes the catalysts and the polyether diols obtained therewith in following the above described propoxylation reactions.

probe upon stepwise addition of PO into a 2 liter stainless steel autoclave reactor equipped with an anchor agitator.

166 g of polypropylene glycol starter was first mixed in the reactor with 5 ppm of the catalyst to be evaluated, in a similar procedure to that described in Example 1. The reactor was heated up to 125° C. and 20.8 g (25 ml) of PO was added to initiate the reaction. After the sudden pressure drop occurred, the stepwise addition of PO was started (10% PO, 1.7 ml, 30 ml/min). After each addition, the concentration of PO showed the expected exponential decrease of $1^{st}$ order kinetics.

The propoxylation times, which are critical for catalyst activity, correspond to the period between catalyst activation—the end of the induction period—and the end of propylene oxide addition. The total reaction time is the sum of the induction and propoxylation times.

The rate constant (k′/[P*]) after each feed step was calculated and the change of the rate constant upon dilution

TABLE 2

| DMC Catalyst | Catalyst Characterization | | Propoxylation at 100 ml scale | Propoxylation at 1 L scale Polymer Properties | | |
|---|---|---|---|---|---|---|
| | Zn [%] | Co [%] | $t_{Induction}$ [min] | Polydispersity (PDI) | Viscosity [mPas] | OH Number [mg KOH/g] |
| Example A | 14.47 | 8.28 | 6 | 1.3 | 8000 | 11.0 |
| Example B | 12.51 | 7.32 | 5 | 1.2 | 5590 | 10.3 |
| Example C | 16.32 | 9.18 | 5 | 1.5 | 10480 | 10.8 |
| Example D | 11.27 | 7.69 | 47 | n/a* | n/a* | n/a* |
| Example E | 11.67 | 6.77 | 9 | 1.3 | 8240 | 10.7 |
| Example F | 12.62 | 7.41 | 19 | 1.6 | 17920 | 10.3 |
| Example G | 12.44 | 7.91 | 4 | 1.2 | 7200 | 10.2 |
| Example H | 14.21 | 8.30 | 12 | 1.5 | 15630 | 10.5 |
| Example I | 12.88 | 7.48 | 7 | 1.3 | 7300 | 10.4 |
| Example J | 27.55 | 14.34 | 4 | 1.2 | 7000 | 10.0 |
| Example K | 16.71 | 9.16 | 8 | 1.3 | 6180 | 10.4 |
| Example L | 14.43 | 8.26 | 5 | 1.3 | 7800 | 10.3 |

*No product for analytical test was available as the catalyst showed no proper reactivity.

Determination of the Catalyst Activity

In the above described polymerization process, the propagation reaction is of the form:

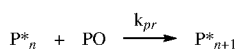

$$P^*_n + PO \xrightarrow{k_{pr}} P^*_{n+1}$$

wherein: P* represents a reactive polymer chain; n the number of monomeric units; PO denotes a propylene oxide molecule; and, $k_{pr}$ the rate constant of the propoxylation reaction.

Considering the Rate Law $$r_{pr} = -\frac{d[PO]}{dt} = k' \cdot [PO] \text{ with } k' = k_{pr} \cdot [P']$$

and also considering that in an immortal polymerization the number of chain ends ($n_{P*}$) stays constant, an integration of the rate law leads to:

$$\ln[PO] = k' \cdot t + \ln[PO]_0$$

The propagation reaction is then treated as pseudo first-order.

For determining the rate constants, a discontinuous feeding method was used, in which the consumption of propylene oxide (PO) was monitored with an in situ infrared (IR)

of the hydroxyl chain ends—as a consequence of the chain growth—is presented in FIG. 8. A comparison of the rate constants for the evaluated catalysts after the first PO dosing is also presented in Table 3 below.

TABLE 3

Rate Constants after the first PO dosing for the propoxylation reaction using different catalysts

| Catalyst Used | Rate Constant (k′/[P*]) |
|---|---|
| Example A | 9.02E−04 |
| Example J | 4.27E−04 |
| Example K | 1.24E−04 |

In view of the foregoing description and examples, it will be apparent to those skilled in the art that equivalent modifications thereof can be made without departing from the scope of the claims.

The invention claimed is:

1. A supported catalyst having the general Formula (I):

[DMCC]*b Supp    (I)

wherein:

[DMCC] denotes a double metal cyanide complex which comprises a double metal cyanide (DMC) compound, at least one organic complexing agent and a metal salt;

Supp denotes a hydrophobic support material; and, b represents the average proportion by weight of said support material, based on the total weight of [DMCC] and Supp;

wherein the hydrophobic support material is selected from the group consisting of inorganic oxides having an organosiloxane group bound thereto; inorganic hydroxides having am organosiloxane group bound thereto; inorganic oxides having an oleochemical derivative bound thereto; inorganic hydroxides having an oleochemical derivative bound thereto; calcium carbonate having an oleochemical derivative bound thereto; clay; and carbonaceous inorganic solid materials.

2. The supported catalyst according to claim 1, wherein b is in the range of 10 wt. %≤b≤70 wt. %.

3. The supported catalyst according to claim 1, wherein said double metal cyanide complex [DMCC] is represented either by the general Formula (II-A)

$$M^1_d[M^2(CN)_e]_f * xM^3(X)_g * yH_2O * \omega L \quad \text{(II-A); or}$$

by general Formula (II):

$$M^1_d[M^2(CN)_e]_f * xM^3(X)_g * yH_2O * zL^1 * aL^2 \quad \text{(II)}$$

wherein:
$M^1$ is a Zn, Fe, Co, Ni, Mn, Cu, Sn or Pb ion;
$M^2$ is a Fe, Co, Mn, Cr, Ir, Rh, Ru or V ion;
$M^3$ is a Zn, Fe, Co, Ni, Mn, Cu, Sn, Pb, Cr, Ir, Rh, Ru or V ion;
X is an anion;
L is an organic complexing agent;
$L^1$ and $L^2$ are distinct from one another and represent respectively first and second organic complexing agents;
d, e, f and g are each integers >0 but have values such that the complex $M^1_d[M^2(CN)_e]_f * xM^3(X)_g$ is electrically neutral;
$0.1 \leq x \leq 5$;
$0.1 \leq y \leq 1$;
$0.0001 \leq \omega \leq 6$;
$0.0001 \leq z \leq 1$; and, $0.0001 \leq a \leq 5$.

4. The supported catalyst according to claim 3, wherein said double metal cyanide complex [DMCC] is represented by Formula (II-A) and further meets at least one of the following conditions:
i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) L is selected from the group consisting of aliphatic $C_1$ to $C_{24}$ alcohols, monoglyme, diglyme, 1,4-dioxane, furan, polypropyleneglycol (PPG) homopolymers, polypropyleneglycol (PPG) copolymers and mixtures of two or more thereof.

5. The supported catalyst according to claim 3, wherein said double metal cyanide complex [DMCC] is represented by Formula (II) and further meets at least one of the following conditions:
i) $M^1$ is equal to $M^3$;
ii) X is an anion selected from the group consisting of halide, hydroxide, sulphate, carbonate, cyanide, thiocyanide, carboxylate, nitrate, borate and antimonite; and,
iii) $L^1$ and $L^2$ are independently selected from the group consisting of aliphatic $C_1$ to $C_{24}$ alcohols, monoglyme, diglyme, 1,4-dioxane, furan, polypropyleneglycol (PPG) homopolymers, polypropyleneglycol (PPG) copolymers and mixtures of two or more thereof.

6. The supported catalyst according to claim 3, wherein:
i) $M^1$ is equal to $M^3$ and is Zn; $M^2$ is Co; and,
ii) X is a halide.

7. The supported catalyst according to claim 1, wherein the hydrophobic support material (Supp) has a methanol wettability value of from 30 to 80 vol. %.

8. The supported catalyst according to claim 1, wherein the hydrophobic support material (Supp) is selected from silica having an organosiloxane group bound thereto or calcium carbonate having an oleochemical derivative bound thereto.

9. The supported catalyst according to claim 1, wherein the carbonaceous inorganic solid materials are is selected from activated charcoal, carbon black, carbon nanotubes, fullerene, or graphene.

10. The supported catalyst according to claim 1, wherein the hydrophobic support material (Supp) is selected from the group consisting of silica having an organosiloxane group bound thereto, fumed silica having an organosiloxane group bound thereto, calcium carbonate having an oleochemical derivative bound thereto, activated charcoal, carbon black and graphene.

11. A method for producing the supported catalyst of Formula (I) as defined in claim 1, comprising the steps of:
i) mixing in an aqueous medium
a) at least one complexing agent;
b) the hydrophobic support (Supp);
c) at least one salt of the general formula (IIa);

$$M^1_d X_g \quad \text{(IIa)}$$

where $M^1$ is a Zn, Fe, Co, Mn, Cu, Sn, Pb or Ni ion, X is an anion, and d and g are integers >0 and assume values such that the salt $M^1_d X_g$ is electroneutral; and,
d) at least one complex of the general formula (IIb)

$$M^3_h[M^2(CN)_e]_f \quad \text{(IIb)}$$

where $M^3$ is an alkali metal ion, $M^2$ is a Co, Cr, Mn, Ir, Rh, Ru, V or Fe ion and h, e and f are integers >0 and assume values such that the complex $M^3_h[M^2(CN)_e]_f$ is electroneutral;
ii) washing the obtained catalyst with an aqueous solution;
iii) drying the washed catalyst.

12. A method for producing the supported catalyst of Formula (I) as defined in claim 1, comprising the steps of:
i) mixing in an aqueous medium
a) at least one complexing agent;
c) at least one salt of the general formula (IIa);

$$M^1_d X_g \quad \text{(IIa)}$$

where $M^1$ is a Zn, Fe, Co, Mn, Cu, Sn, Pb or Ni ion, X is an anion, and d and g are integers >0 and assume values such that the salt $M^1_d X_g$ is electroneutral; and,
d) at least one complex of the general formula (IIb)

$$M^3_h[M^2(CN)_e]_f \quad \text{(IIb)}$$

where $M^3$ is an alkali metal ion, $M^2$ is a Co, Cr, Mn, Ir, Rh, Ru, V or Fe ion and h, e and f are integers >0 and assume values such that the complex $M^3_h[M^2(CN)_e]_f$ is electroneutral;
ii) washing the obtained catalyst with an aqueous solution;
iii) drying the washed catalyst, wherein b) the hydrophobic support (Supp) is added before or during the washing step ii) or after the drying step iii).

13. A method for producing a functionalized polymer or copolymer, said method comprising the steps of:
   a) providing an initiator, said initiator comprising or consisting of an active hydrogen-containing compound capable of alkoxylation by an epoxide compound;
   b) providing a supported catalyst as defined in claim 1; and,
   in the presence of said initiator and said supported catalyst, performing a ring opening polymerization of at least one epoxide monomer or co-polymerization of carbon dioxide and at least one epoxide monomer.

14. A coating, sealant or adhesive composition based on active hydrogen reactive compounds comprising the functionalized polymer or copolymer of prepared by the method according to claim 13 as a reactive component.

15. A supported catalyst having the general Formula (I):

$$[DMCC] *b \text{ Supp} \qquad (I)$$

wherein:
   [DMCC] denotes a double metal cyanide complex which comprises a double metal cyanide (DMC) compound, two organic complexing agents that are distinct from the other, and a metal salt;

Supp denotes a hydrophobic support material; and,
   b represents the average proportion by weight of said support material, based on the total weight of [DMCC] and Supp;
   wherein the hydrophobic support material is selected from the group consisting of hydrophobic materials having a methanol wettability value of at least 30 vol. %; carbonaceous inorganic solid materials; and inorganic solid materials which are isoelectronic with carbon.

16. The supported catalyst according to claim 15, wherein said double metal cyanide complex [DMCC] is represented by general Formula (II):

$$M^1_d[M^2(CN)_e]_f * xM^3(X)_g * yH_2O * zL^1 * aL^2 \qquad (II)$$

wherein:
   $M^1$ is a Zn, Fe, Co, Ni, Mn, Cu, Sn or Pb ion;
   $M^2$ is a Fe, Co, Mn, Cr, Ir, Rh, Ru or V ion;
   $M^3$ is a Zn, Fe, Co, Ni, Mn, Cu, Sn, Pb, Cr, Ir, Rh, Ru or V ion;
   X is an anion;
   $L^1$ and $L^2$ are distinct from one another and represent respectively first and second organic complexing agents;
   d, e, f and g are each integers >0 but have values such that the complex $M^1_d[M^2(CN)_e]_f * xM^3(X)_g$ is electrically neutral;
   $0.1 \leq x \leq 5$;
   $0.1 \leq y \leq 1$;
   $0.0001 \leq z \leq 1$; and, $0.0001 \leq a \leq 5$.

* * * * *

UNITED STATES PATENT AND TRADEMARK OFFICE
CERTIFICATE OF CORRECTION

PATENT NO. : 11,883,803 B2
APPLICATION NO. : 17/123758
DATED : January 30, 2024
INVENTOR(S) : Jan-Erik Damke et al.

It is certified that error appears in the above-identified patent and that said Letters Patent is hereby corrected as shown below:

In the Specification

Column 2, Line 25 change "Willer et al" to --Muller et all--.
Column 14, Line 3 change "2390" to --ZS90--.
Column 17, Line 57 change "bisphenol -NF" to --bisphenol -A/F--.

Signed and Sealed this
Thirteenth Day of August, 2024

Katherine Kelly Vidal
*Director of the United States Patent and Trademark Office*